(12) United States Patent
Corry et al.

(10) Patent No.: US 12,388,370 B2
(45) Date of Patent: Aug. 12, 2025

(54) INTEGRATED POWER CONVERTER WITH ISOLATED-CHANNEL FEEDBACK INTERFACE

(71) Applicant: TEXAS INSTRUMENTS INCORPORATED, Dallas, TX (US)

(72) Inventors: Michael Corry, Plano, TX (US); Jose V. Formenti, Dallas, TX (US); Robert Martinez, Lucas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 272 days.

(21) Appl. No.: 17/827,447

(22) Filed: May 27, 2022

(65) Prior Publication Data
US 2023/0402930 A1 Dec. 14, 2023

(51) Int. Cl.
*H02M 3/335* (2006.01)
*H02M 1/32* (2007.01)
*H02M 1/36* (2007.01)

(52) U.S. Cl.
CPC ......... *H02M 3/33523* (2013.01); *H02M 1/32* (2013.01); *H02M 1/327* (2021.05); *H02M 1/36* (2013.01)

(58) Field of Classification Search
CPC ......... H02M 3/33573; H02M 3/33523; H02M 3/335; H02M 3/33553; H02M 1/32; H02M 1/36; H02M 1/327; H02M 1/0025; H02M 1/0016
See application file for complete search history.

(56) References Cited

U.S. PATENT DOCUMENTS

| | | | | |
|---|---|---|---|---|
| 6,088,244 A | * | 7/2000 | Shioya | H02M 3/33523 323/902 |
| 8,520,415 B1 | * | 8/2013 | Krishnamoorthy | H02M 3/33523 363/21.17 |
| 9,960,665 B2 | * | 5/2018 | Boncato | H02M 1/4225 |
| 11,095,226 B2 | * | 8/2021 | Arima | H02M 3/33523 |
| 2007/0053212 A1 | * | 3/2007 | Vieira Formenti | H02J 7/04 363/21.01 |
| 2008/0136342 A1 | * | 6/2008 | Tamegai | H02M 3/33507 315/209 R |
| 2009/0213623 A1 | * | 8/2009 | Yang | H02M 3/33592 363/125 |
| 2012/0262950 A1 | * | 10/2012 | Nate | H02M 3/33507 363/16 |

(Continued)

*Primary Examiner* — Gustavo A Rosario-Benitez
(74) *Attorney, Agent, or Firm* — Charles F. Koch; Frank D. Cimino

(57) ABSTRACT

In some examples, an apparatus includes: a power stage having a power stage voltage input, a power stage control input, and a power stage output; a controller having a power stage control output coupled to the power stage control input, an output voltage status terminal, and a status signal input; a transformer having a primary side coil coupled to the power stage output, and a secondary side coil; a feedback voltage processor having a feedback input coupled to the secondary side coil, and a feedback output; a control message generator having a control input coupled to the secondary side coil, and a control message output; a status signal generator having first and second signal inputs coupled to respective feedback and control message outputs, and a status signal output; and a communication channel device coupled between the status signal input and output.

32 Claims, 24 Drawing Sheets

(56) References Cited

U.S. PATENT DOCUMENTS

| | | | | |
|---|---|---|---|---|
| 2014/0160810 A1* | 6/2014 | Zheng | ............... | H02M 3/33576 363/21.17 |
| 2015/0249380 A1* | 9/2015 | Hayakawa | ........ | H02M 3/33523 363/21.16 |
| 2015/0372603 A1* | 12/2015 | Tang | ................ | H02M 3/33523 363/21.15 |
| 2016/0036340 A1* | 2/2016 | Kikuchi | ................. | H02M 1/32 363/21.14 |
| 2016/0359419 A1* | 12/2016 | Lin | ................... | H02M 3/33592 |
| 2020/0089295 A1* | 3/2020 | Sato | ........................ | H02M 1/32 |
| 2020/0412231 A1* | 12/2020 | Khamesra | ............... | H02M 1/32 |
| 2021/0111633 A1* | 4/2021 | Lee | ................... | H02M 3/33523 |
| 2021/0329759 A1* | 10/2021 | Liu | ..................... | H05B 45/357 |
| 2022/0200476 A1* | 6/2022 | Ahmed | ............. | H02M 3/33576 |

\* cited by examiner

INTEGRATED POWER CONVERTER WITH ISOLATED-CHANNEL FEEDBACK INTERFACE

BACKGROUND

An isolated power converter can provide galvanic isolation between circuits coupled to a voltage input of the power converter (e.g., a power source) and circuits coupled to a voltage output of the power converter (e.g., a holding capacitor and a load). The galvanic isolation can prevent current flowing directly between the input and output of the power converter, which can improve safety.

An isolated power converter may include a power stage and a transformer. The primary side of the transformer can be coupled to the power stage and the power source, the secondary side of the transformer can be coupled to the load and the holding capacitor, which are coupled in parallel, and the transformer can provide the galvanic isolation. During an on-time period in which the power stage is turned on/enabled, the load and the capacitor can be magnetically coupled to the power source through the transformer. The load can receive a current from the power source via the transformer, and the holding capacitor can be charged by the power source via the transformer to a target voltage. During an off-time period in which the power stage is turned off/disabled, the load and the holding capacitor can be disconnected from the power source, and the holding capacitor can discharge and supply a current to the load. The target voltage across the load/holding capacitor, and the current supplied to the load, can be determined based on the respective durations of the on-time period and the off-time period of the power stage.

SUMMARY

An apparatus includes a power stage and a controller. The power stage has a power stage control input. The controller has a control input, a control output, and an output voltage status terminal. The control output is coupled to the power stage control input. The controller is configured to: receive a status signal at the control input, in which the status signal includes a feedback indicator and a control message, the feedback indicator represents a relationship between an output voltage and a target voltage, and the control message indicates whether the output voltage is within a target voltage range; responsive to the feedback indicator, provide a control signal at the control output; and responsive to the control message, set a state of the output voltage status terminal indicating whether the output voltage is within the target voltage range.

An apparatus includes a feedback voltage processor, a control message generator, and a status signal generator. The feedback voltage processor has first and second inputs and a feedback output. The first input is coupled to a power converter output terminal. The second input is coupled to a target voltage terminal. The feedback voltage processor is configured to generate a feedback indicator at the feedback output responsive to a first voltage at the power converter output terminal and a target voltage at the target voltage terminal. Also, the control message generator has a control input and a control message output. The control input is coupled to the power converter output terminal. The control message generator is configured to provide a control message at the control message output responsive to whether the first voltage is within a target voltage range. Further, the status signal generator has a first signal input, a second signal input, and a status signal output. The first signal input is coupled to the feedback output. The second signal input is coupled to the control message output. The status signal generator is configured to: receive the feedback indicator at the first signal input; receive the control message at the second signal input; and provide a status signal at the status signal output, the status signal including the feedback indicator and the control message.

An apparatus includes a primary side circuit, a secondary side circuit, a transformer, and a communication channel device. The primary side circuit includes a power stage and a controller. The power stage has a power stage voltage input, a power stage control input, and a power stage output. The controller has a power stage control output, an output voltage status terminal, and a status signal input, and the power stage control output is coupled to the power stage control input. The transformer has a primary side coil and a secondary side coil, and the primary side coil is coupled to the power stage output. The secondary side circuit has a secondary side input and an output voltage terminal, the secondary side input coupled to the secondary side coil. The secondary side circuit includes a feedback voltage processor, a control message generator, and a status signal generator. The feedback voltage processor has a feedback input and a feedback output, the feedback input coupled to the output voltage terminal. The control message generator has a control input and a control message output, the control input coupled to the output voltage terminal. The status signal generator has first and second signal inputs and a status signal output, the first signal input coupled to the feedback output, and the second signal input coupled to the control message output. The and communication channel device has a channel input and a channel output, the channel input coupled to the status signal output, and the channel output coupled to the status signal input.

A method comprises: receiving a status signal via a communication channel between primary side and secondary side circuits of a power converter, in which the status signal includes a feedback indicator and a control message, in which the feedback indicator represents a relationship between a target voltage and an output voltage of the secondary side circuit, and the control message indicates whether the output voltage is within a target voltage range. The method further comprises: determining a state of the feedback indicator, and responsive to the state of the feedback indicator, set an on-time period and an off-time period of a power stage of the primary side circuit. The method further comprises responsive to the control message, set a state of an output voltage status terminal indicating whether the output voltage is within the target voltage range.

A method comprises: receiving a first voltage from an output of a power converter, and generating a feedback indicator representing a relationship between the first voltage and a target voltage. The method further comprises generating a control message indicating whether the first voltage is within a target voltage range. The method further comprises: generating a status signal including the feedback indicator and the control message, and transmitting the status signal via a communication channel between primary and secondary side circuits of the power converter.

DETAILED DESCRIPTION

Figure 1:
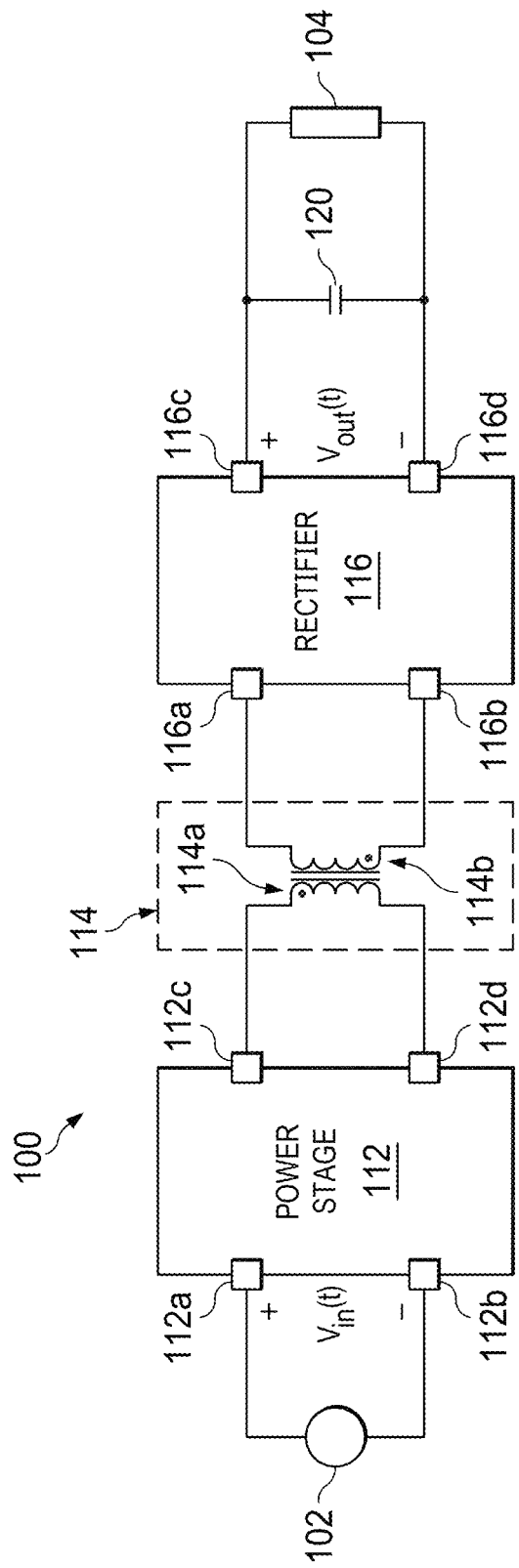
FIG. 1 is a schematic diagram of an example power converter.

FIG. 1 is a schematic diagram of an example power converter 100. Power converter 100 can transfer power from a power source 102 to a load 104. Load 104 can include electronic components that receive power from power source 102 via power converter 100. For example, load 104 can include driver circuits for a motor. Power converter 100 can also provide a voltage $V_{out}$ to load 104 based on a voltage $V_{in}$ received from power source 102 based on a conversion ratio. In a case where power converter 100 is a step-up converter (e.g., a boost converter), the conversion ratio can be higher than one, and $V_{out}$ can be higher than $V_{in}$. In a case where power converter 100 is a step-down converter (e.g., a buck converter), the conversion ratio can be lower than one, and $V_{out}$ can be lower than $V_{in}$.

In some examples, power converter 100 can be an isolated power convertor and includes a power stage 112 and a transformer 114. Power stage 112 have terminals 112a and 112b coupled to power source 102, and terminals 112c and 112d coupled to a primary side coil 114a of transformer 114, and secondary side coil 114b can be coupled to load 104. Transformer 114 can provide a galvanic isolation between power source 102 and load 104 and prevent a current from directly flowing between them, which can improve safety, while allowing transfer of power via magnetic coupling between primary side coil 114a and secondary side coil 114b.

In some examples, isolated power converter 100 may include a rectifier 116 and a holding capacitor 120. Rectifier 116 have terminals 116a and 116b coupled to secondary side coil 114b and terminals 116c and 116d coupled to load 104. Rectifier 116 can perform a rectification operation on the output of secondary side coil 114b to maintain the relative polarities of terminals 116c and 116d, so that $V_{out}$ can be a direct current (DC) voltage. Holding capacitor 120 can further reduce the ripple of $V_{out}$ when power stage 112 is enabled to transfer power from power source 102 to load 104. Also, when power stage 112 is disabled and load 104 is disconnected from power source 102, holding capacitor 120 can supply a current to load 104, and provide the $V_{out}$ voltage across load 104.

Figure 2:
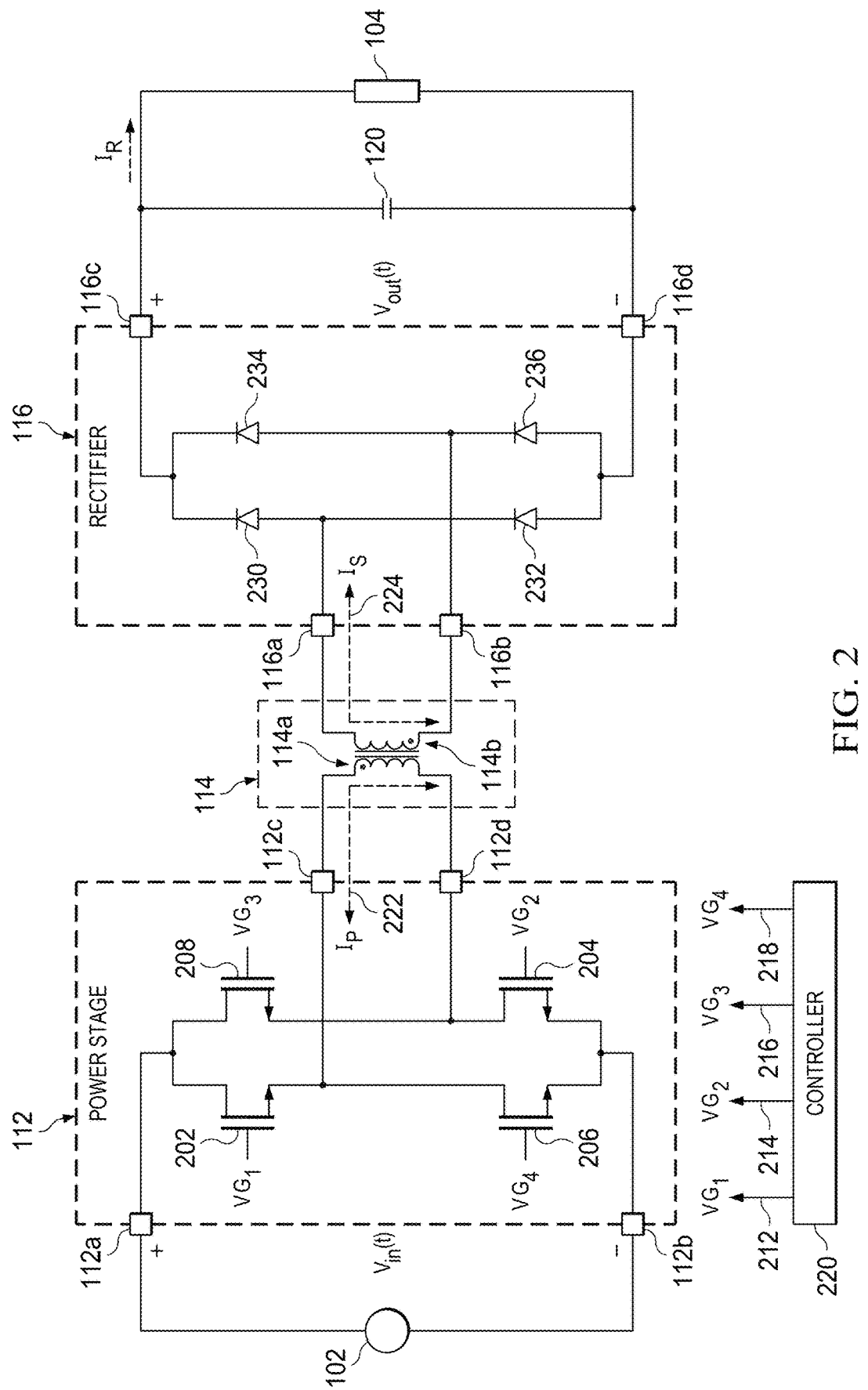
FIG. 2 is a schematic diagram that illustrates example internal components of the power converter of FIG. 1.

FIG. 2 is a schematic diagram that illustrates example internal components of power stage 112 and rectifier 116. Referring to FIG. 2, power stage 112 may include switches 202, 204, 206, and 208. Switches 202 and 206 can be coupled in series between terminals 112a and 112b, and both switches can have a terminal coupled to terminal 112c. Also, switches 204 and 208 can be coupled in series between terminals 112a and 112b, and both switches can have a terminal coupled to terminal 112d. Each switch can include a transistor, such as an n-channel field effect transistor (NFET), or a gallium nitride (GaN) high electron mobility transistor (HEMT). Switches 202, 204, 206, and 208 can be controlled by, respectively, control signals 212, 214, 216, and 218 (also labelled $V_{G1}$, $V_{G2}$, $V_{G3}$, and $V_{G4}$ in FIG. 2) provided by a controller 220. Also, primary side coil 114a and secondary side coil 114b can be in a dot-reversed configuration, so that primary side current signal 222 (also labelled $I_P$ in FIG. 2) can have a 180° phase shift with respect to secondary side current signal 224 (also labelled $I_S$ in FIG. 2), as represented by the opposite arrow directions of the current signals. Further, rectifier 116 can include a rectifier bridge including diodes 230, 232, 234, and 236, with the bridge inputs coupled to terminals 116a and 116b and the bridge outputs coupled to terminals 116c and 116d. Rectifier 116 can provide a rectifier current 226 (labelled $I_R$ in FIG. 2) to load 104 and holding capacitor 120 responsive to secondary side current signal $I_S$.

In some examples, controller 220 generates control signals $V_{G1}$, $V_{G2}$, $V_{G3}$, and $V_{G4}$ as multi-cycle signals to enable/disable, respectively, switches 202, 204, 206, and 208. During an on-time period of power stage 112, controller 220 alternates between enabling switches 202 and 204 and enabling switches 206 and 208, to conduct primary side current signal 222 through primary side coil 104a. Primary side current signal 222 can induce secondary side current signal 224 at secondary side coil 114b, and rectifier 116 can provide secondary side current signal 224 to load 104 and to charge holding capacitor 120. Also, during the off-time period of power stage 112, controller 220 de-asserts $VG_1$ and $VG_2$ and asserts $VG_3$ and $VG_4$. Primary side coil 114a can be disconnected from power source 102 to remove energy stored in transformer 114, and holding capacitor 120 can discharge to supply a current to load 104, and provide the $V_{out}$ voltage across load 104. By controlling the on-time period and off-time period of each cycle, controller 220 can set a particular conversion ratio between $V_{out}$ and $V_{in}$.

Figure 3:
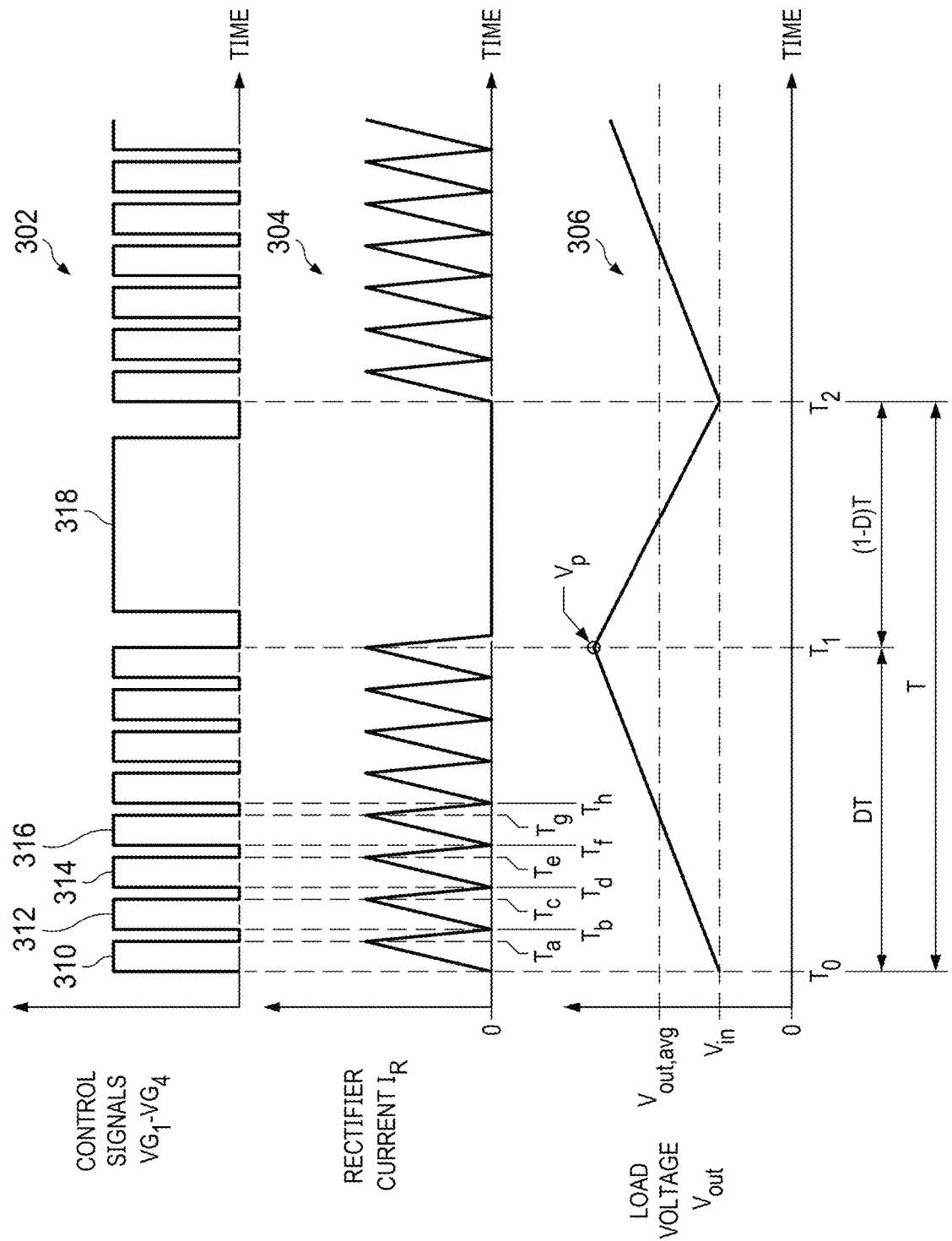
FIG. 3 are waveform diagrams that illustrate example operations of the power converter of FIG. 1.

FIG. 3 includes waveform graphs that illustrate example operations of power converter 100 and controller 220. FIG. 3 includes graphs 302, 304, and 306. Graph 302 illustrates an example variation of control signals $VG_1$, $VG_2$, $VG_3$, and $VG_4$ with respect to time. Graph 304 illustrates an example variation of rectifier current $I_R$ with respect to time, and graph 306 illustrates an example variation of $V_{out}$ voltage across load 104 with respect to time.

Referring to graph 302, during an on-time period of power stage 112 between times $T_0$ and $T_1$, controller 220 generates control signals $VG_1$, $VG_2$, $VG_3$, and $VG_4$ to alternate between enabling switches 202 and 204 and enabling switches 206 and 208 between consecutive switching cycles. In the example of FIG. 3, a first switching cycle can be between times $T_0$ and $T_b$, a second switching cycle can be between times $T_b$ and $T_d$, a third switching cycle can be between times $T_d$ and $T_f$, and a fourth switching cycle can be between times $T_f$ and $T_h$. The initial $V_{out}$ voltage can be equal to $V_n$.

In the first switching cycle between $T_0$ and $T_a$, controller 220 asserts $VG_1$ and $VG_2$, as represented by pulse 310, and de-asserts $VG_3$ and $VG_4$. Referring again to FIG. 2, with switches 202 and 204 enabled and switches 206 and 208 disabled, primary side current $I_P$ can flow from power source 102 through terminal 112a, terminal 112c, primary side coil 114a, terminal 112d, and return back to power source 102 via terminal 112b. Referring to graph 304, between $T_0$ and $T_a$, primary side current $I_P$ can also increase with time as transformer 114 stores the magnetic energy. Secondary side current $I_S$ can be induced on the secondary side coil 114b, which can increase with time. Also, diodes 230 and 236 can conduct secondary side current $I_S$ as rectifier current $I_R$, which also increases with time. Also, between $T_a$ and $T_b$ controller 220 de-asserts $VG_1$ through $VG_4$, and power source 102 can be disconnected from primary side coil 114a and transformer 114. Transformer 114 can discharge the stored magnetic energy to provide secondary side current $I_S$, which can decrease with time as the magnetic energy is discharged. Rectifier current $I_R$ also decreases with time. Within the first switching cycle (between $T_0$ and $T_b$) a non-zero rectifier current $I_R$ is supplied to charge holding capacitor 120. Accordingly, the load voltage $V_{out}$ increases from the initial voltage $V_n$ with time within the first switching cycle.

In the second switching cycle between $T_b$ and $T_d$, controller 220 asserts $VG_3$ and $VG_4$, as represented by pulse 312, and de-asserts $VG_1$ and $VG_2$. Referring again to FIG. 2, with switches 206 and 208 enabled and switches 202 and 204 disabled, primary side current $I_P$ can flow from power source 102 through terminal 112a, terminal 112d, primary side coil 114a, terminal 112c, and return back to power source 102 via terminal 112b. Both primary side current $I_P$ and secondary side current $I_S$ increase with time as transformer 114 stores the magnetic energy. Secondary side current $I_S$ can flow in an opposite direction as compared with the first switching cycle, and diodes 234 and 232 can conduct secondary side current $I_S$ as rectifier current $I_R$ to maintain the flow direction of $I_R$ as in the first switching cycle. Between $T_c$ and $T_d$ controller 220 de-asserts $VG_1$ through $VG_4$, power source 102 can be disconnected from primary side coil 114a and transformer 114, and secondary side current $I_S$ and rectifier current $I_R$ can decrease with time. Within the second switching cycle (between $T_c$ and $T_d$) a non-zero rectifier current $I_R$ is supplied to charge holding capacitor 120. Accordingly, the load voltage $V_{out}$ continues increasing with time within the second switching cycle.

For the rest of the on-time period, controller 220 continues alternating between enabling switches 202 and 204 in the third switching cycle (by asserting $VG_1$ and $VG_2$ and de-asserting $VG_3$ and $VG_4$, represented by pulse 314), and enabling switches 206 and 208 in the fourth switching cycle (by asserting $VG_3$ and $VG_4$ and de-asserting $VG_1$ and $VG_2$, represented by pulse 316). Because a non-zero rectifier current $I_R$ is supplied to charge holding capacitor 120, the load voltage $V_{out}$ increases with time within the on-time period, and reaches a peak voltage $V_p$ at $T_1$ when the on-time period ends.

Also, within the off-time period between $T_1$ and $T_2$, controller 220 disables switches 202 and 208, and enable switches 204 and 206. Controller 220 de-asserts $VG_1$ and $VG_3$ and asserts $VG_2$ and $VG_4$, as represented by pulse 318. Transformer 114 can be disconnected from power source 102 to remove the stored magnetic energy, and no primary side current $I_P$ flows during the off-time period. The secondary side current $I_S$ and the rectifier current $I_R$ are also zero during the off-time period, and holding capacitor 120 can discharge to provide a current to load 104. Accordingly, the $V_{out}$ voltage drops from $V_p$ back to $V_n$.

In FIG. 3, a sum of the on-time period and the off-time period can represent a switching cycle of power stage 112. The total duration of the on-time period (which can include multiple switching cycles of control signals $VG_1$ through $VG_4$) and the off-time period (in which $VG_1$ an $VG_3$ can be equal to T, the duration of the on-time period can be represented by DT where D is a duty cycle of the switching cycle, and the duration of the off-time period can be represented by (1−D)T. The duty cycle D can set the average $V_{out}$ voltage, and the conversion ratio between $V_{out}$ and $V_{in}$.

As described above, power converter 100 of FIG. 2 can provide galvanic isolation between power source 102 and load 104. Also, controller 220 can set the conversion ratio between $V_{out}$ and $V_{in}$ by setting the duty cycle to provide a specific voltage to load 104. However, various issues can affect the performance of power converter 100 and the safety and reliability of load 104. Specifically, power converter 100 can introduce errors in the conversion ratio, such that the actual conversion ratio is different from a target/desired conversion ratio. Various factors can contribute to the errors, such as temperature, duty cycle error, and mismatches in the inductance between the primary and secondary side coils of transformer 114. If controller 220 were to set the conversion ratio in an open loop operation without information of the actual $V_{out}$ or the actual conversion ratio, controller 220 cannot correct for the errors, and may provide an imprecise $V_{out}$ to load 104.

Also, if controller 220 controls power stage 112 to transfer power to load 104 via transformer 114 without information about an operation status of secondary side coil 114b, rectifier 116, and load 104, various safety and reliability issues may arise. For example, a circuit failure (e.g., short circuit) may occur in power converter 100 and/or load 104, which may prevent secondary side coil 114b from providing the target $V_{out}$, or cause a high current and/or a high temperature in load 104 and/or power converter 100. Without information about the operation status, controller 220 may be unable to detect such a failure and continue to enable power stage 112 to transfer power to load 104. Such arrangements may lead to further increase in the current and/or temperature in load 104, which can create safety hazard and damage load 104 and/or power converter 100. Also, secondary side coil 114b may provide an excessive $V_{out}$ to load 104 that can subject the circuit devices (e.g., gate drivers) of load 104 to substantial voltage stress. If controller 220 cannot detect the excessive $V_{out}$ and continues to enable power stage 112, the substantial voltage stress can shorten the life time of the devices of load 104 and degrade their reliability.

Further, after power converter 100 starts receiving power from power source 102 and transferring power to load 104, it may incur considerable delay in increasing $V_{out}$ to a target voltage, especially for a high target voltage. If the circuit devices of load 104 are enabled or allowed to operate before $V_{out}$ reaches the target voltage, the electrical properties of those circuit devices may become unpredictable, which can compromise the functionality of load 104.

Figure 4:
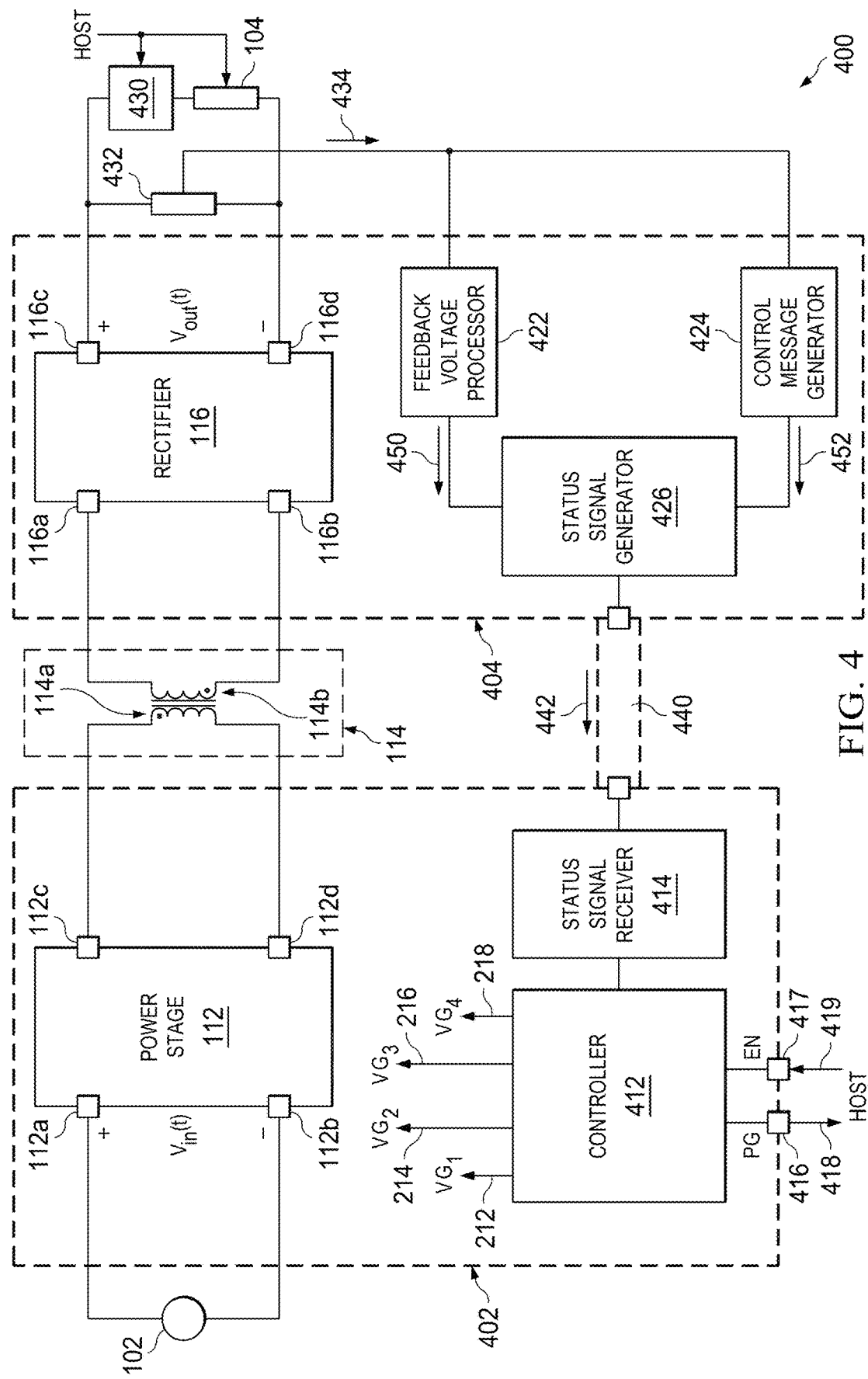
FIG. 4 is a schematic diagram of an example power converter having a communication channel.

FIG. 4 is a schematic diagram of an example power converter 400 that can address at least some of the issues described above. In some examples, power converter 400 includes transformer 114, a primary side circuit 402 coupled to primary side coil 114a of transformer 114, a secondary side 404, and a secondary side circuit 404 coupled to secondary side coil 114b of transformer 114. Primary side circuit 402 includes power stage 112, a controller 412, and a status signal receiver 414. Primary side circuit 402 can include an output voltage status terminal 416 (also labelled "PG" in FIG. 4) and an enable terminal 417 (labelled "EN" in FIG. 4) interfacing a host. Through output voltage status terminal 416, controller 412 can provide a power good signal 418 to the host. Also, through enable terminal 417, controller 412 can receive an enable signal 419 from the host. As to be described below, through power good signal 418 and enable signal 419, controller 412 can interact with the host to perform soft-start operations to allow staged increase of $V_{out}$, and to support a power gating operation to prevent load 104 from drawing power from converter 400 before $V_{out}$ is within a target voltage range.

In some examples, secondary side circuit 404 includes rectifier 116, a feedback voltage processor 422, a control message generator 424, and a status signal generator 426. In some examples, feedback voltage processor 422, control message generator 424, and status signal generator 426 can receive supply voltages from secondary side coil 114b. Secondary side circuit 404 can also be coupled to holding capacitor 120, and load 104 via a power gate 430. Secondary side circuit 404 can also be coupled to a voltage divider network 432 (e.g., a resistive divider, or a capacitive divider) which can provide a feedback voltage 434 as a scaled down version of $V_{out}$.

Figure 5:
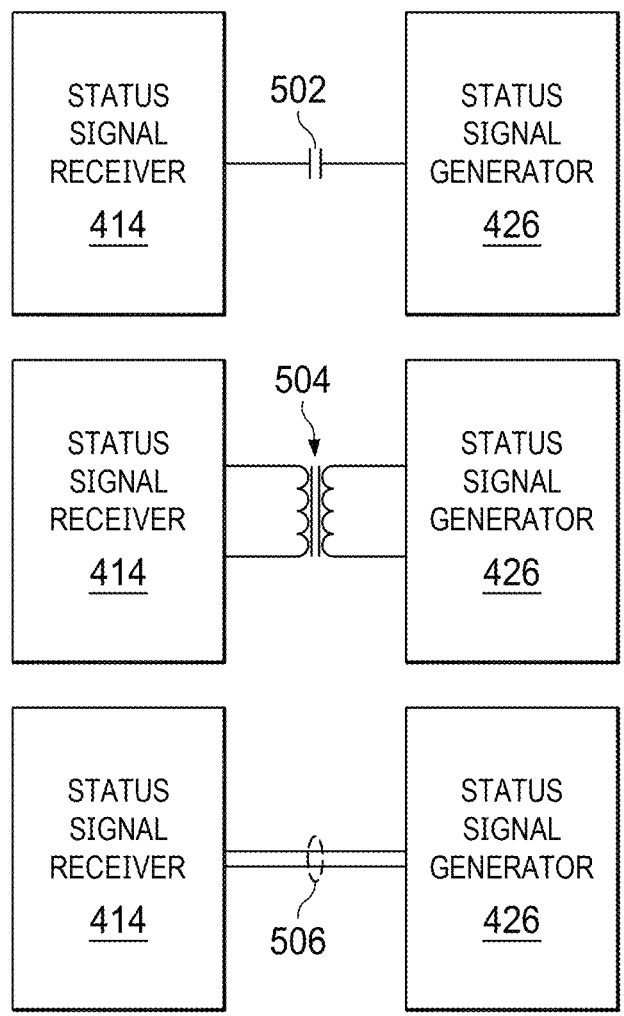
FIG. 5 is a schematic diagram of example implementations of communication channel of FIG. 4.

Further, an output of status signal generator 426 is coupled to an input of status signal receiver 414 via a communication channel 440. Communication channel 440 can include a capacitive channel, a magnetic channel, or an optical channel. Communication channel 440 can be implemented by a device (e.g., a capacitor, a transformer, or an optical device) that can provide electrical isolation between primary side circuit 402 and secondary side circuit 404. FIG. 5 is a schematic diagram of example implementations of communication channel 440 between status signal generator 426 and status signal receiver 414. Referring to FIG. 5, communication channel 440 can be implemented by a device such as a capacitor 502, a transformer 504, or an optical waveguide 506 (e.g., fiber optics).

Figure 23:
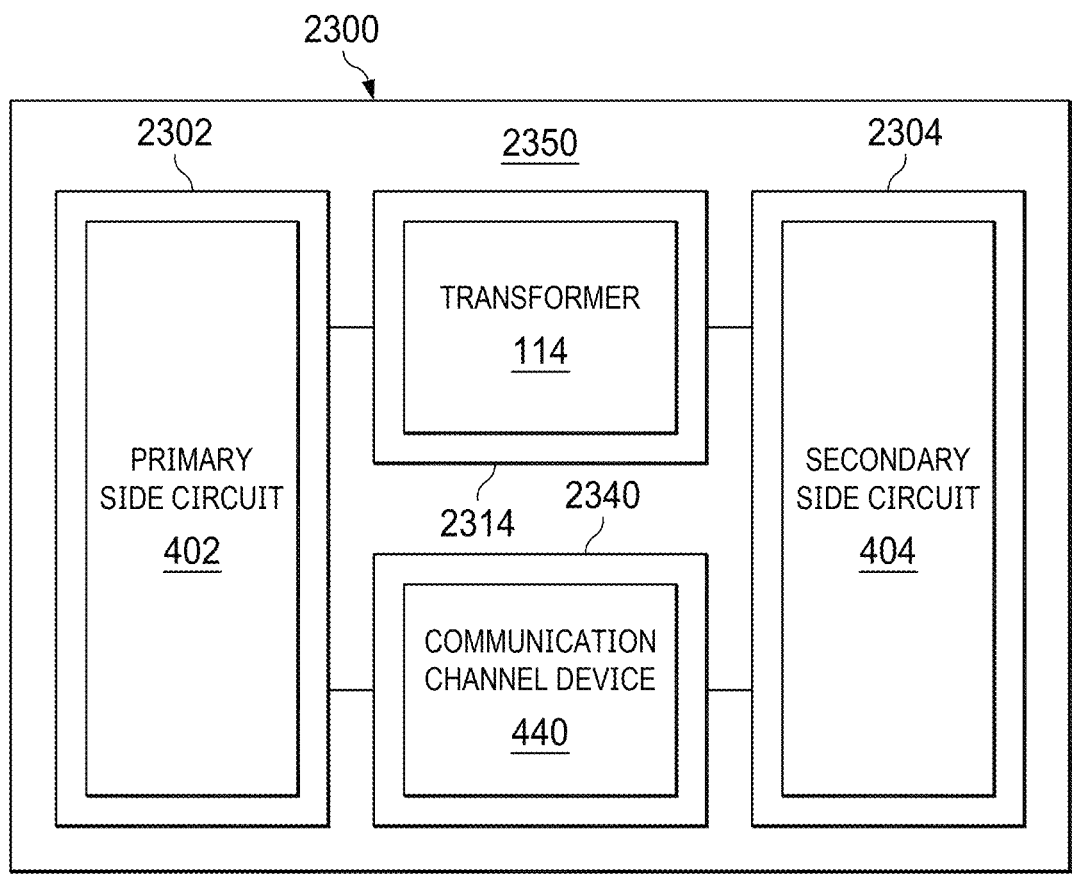
FIG. 23 is a schematic diagram of an example power converter with different semiconductor dies.

In some examples, primary side circuit 402, secondary side circuit 404, transformer 114, and the device providing communication channel 440 (e.g., capacitor 502, transformer 504, or optical waveguide 506) can each be implemented on a different semiconductor die, as shown in FIG. 23 and discussed below. The dies can be coupled by chip-level interconnects within a chip package. In some examples, each of primary side circuit 402, secondary side circuit 404, transformer 114, and the device of communication channel 440 can each be a standalone component, and can be coupled by traces of a printed circuit board (PCB).

Referring again to FIG. 4, from secondary side circuit 404, controller 412 can receive a status signal 442 via status signal receiver 414 and communication channel 440. Status signal 442 can include a feedback indicator 450 generated by feedback voltage processor 422 based on feedback voltage 434. In some examples, feedback indicator 450 can be a hysteretic control signal that indicates whether feedback voltage 434 exceeds a target voltage. Controller 412 can extend the on-time period of a switching cycle of power stage 112 responsive to feedback indicator 450 indicating that feedback voltage 434 is below the target voltage, and start the off-time period responsive to feedback indicator 450 indicating that feedback voltage 434 is above the target voltage. In some examples, feedback indicator 450 can include a code that represents a difference/error between feedback voltage 434 and the target voltage, and controller 412 can determine the durations of the on-time and off-time periods based on the code included in feedback indicator 450. In both examples, controller 412 generates control signals $VG_1$ through $VG_4$ during the respective on-time and off-time periods, to correct for errors in the conversion ratio in a closed loop operation and to provide a more precise $V_{out}$.

Also, status signal 442 can include a control message 452 generated by control message generator 424. Control message 452 can include information about an operation status of power converter 400 (or secondary side circuit 404). The operation status can indicate, for example, whether $V_{out}$ is within a target voltage range that allow safe and/or proper operation of load 104. Control message 452 can represent different types of control messages. For example, control message 452 can include a power good message, a power bad message, or a fault message. The power good message can indicate that $V_{out}$ is within the target voltage range. The power bad message can indicate that $V_{out}$ is outside the target voltage range. The fault message can indicate that for a threshold duration of time, a temperature at secondary side circuit 404 or load 104 exceeds a temperature threshold and/or $V_{out}$ is outside the target voltage range. As to be described below, status signal generator 426 can also transmit one of a power bad message, a power good message, or a fault message between pre-determined intervals to provide a heartbeat signal to controller 412 to indicate that secondary side circuit 404 is active and operational.

Controller 412 can perform different operations in response to the different types of control messages represented by control message 452. For example, responsive to receiving the power good message, controller 412 can set power good signal 418 to a first state (e.g., an asserted state) to indicate that $V_{out}$ is within the target voltage range. Controller 412 can also set power good signal 418 to a second state (e.g., a de-asserted state) responsive to receiving the power bad message. The host can enable power gate 430 to allow load 104 to receive power from power converter 400 if power good signal 418 is in the first state. The host can also disable power gate 430 to prevent load 104 from receiving power from power converter 400 if power good signal 418 is in the second state.

In some examples, load 104 may be directly coupled between terminals 116c and 116d and not through power gate 430. In such examples, load 104 can include circuit blocks that can receive a control signal from the host to enable or disable the circuit blocks. The host can generate the control signal to enable the circuit blocks of load 104 responsive to power good signal 418 being in the first state. The host can also generate the control signal to disable the circuit blocks of load 104 responsive to power good signal 418 being in the second state.

With such arrangements, the host can allow load 104 to operate only when $V_{out}$ reaches the target voltage. Accordingly, the electrical properties and the functionality of load 104 can become more predictable. Also, because power gate 430 can be disabled before $V_{out}$ reaches the target voltage, power converter 400 needs not ramp up both $V_{out}$ and the current supplied to load 104 at the same time, and switches 202-208 of power stage 112 can have reduced driving capabilities. Accordingly, the sizes of switches 202-208 can be shrunk, which can reduce the footprints of power stage 112 and of power converter 400. Also, the parasitic capacitances of the switches can be reduced, which can improve the bandwidth and efficiency of power converter 400.

In some examples, controller 412 may disable power stage 112 (e.g., by setting control signals $VG_1$ through $VG_4$ in a de-asserted state) and stop the power transfer to load 104 responsive to a potential fault condition in secondary side circuit 404 and/or load 104, to improve safety and reliability. For example, controller 412 may also disable/shut down power stage 112 responsive to receiving the fault message, which can indicate that a temperature at secondary side circuit 404 (or power converter 400 as a whole) exceeds a temperature threshold for a threshold duration of time, and/or $V_{out}$ is outside the target voltage range for the threshold duration. In some examples, controller 412 may start a timer responsive to receiving an active enable signal 419 via enable terminal 417. Controller 412 may disable/shut down power stage 112 to stop the transfer of power to load 104 if controller 412 does not receive the power good message before the timer expires. In some examples, controller 412 may also monitor for state changes in status signal 442, which can indicate that secondary side circuit 404 is active. If controller 412 detects no state change in status signal 442 for a threshold duration of time, which can represent a heartbeat interval, controller 412 may disable power stage 112. In all these examples, controller 412 may determine that secondary side circuit 404 is likely to be in a fault condition and stop the power transfer to load 104, which can reduce safety hazard and risk of damage to load 104.

Figure 6:
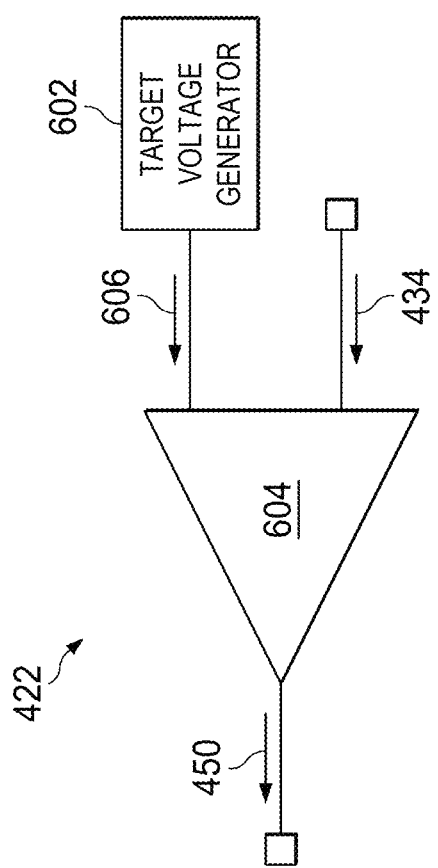
FIG. 6, FIG. 7, and FIG. 8 are schematic diagrams of example internal components of a secondary side circuit of the power converter of FIG. 4.
Figure 7:
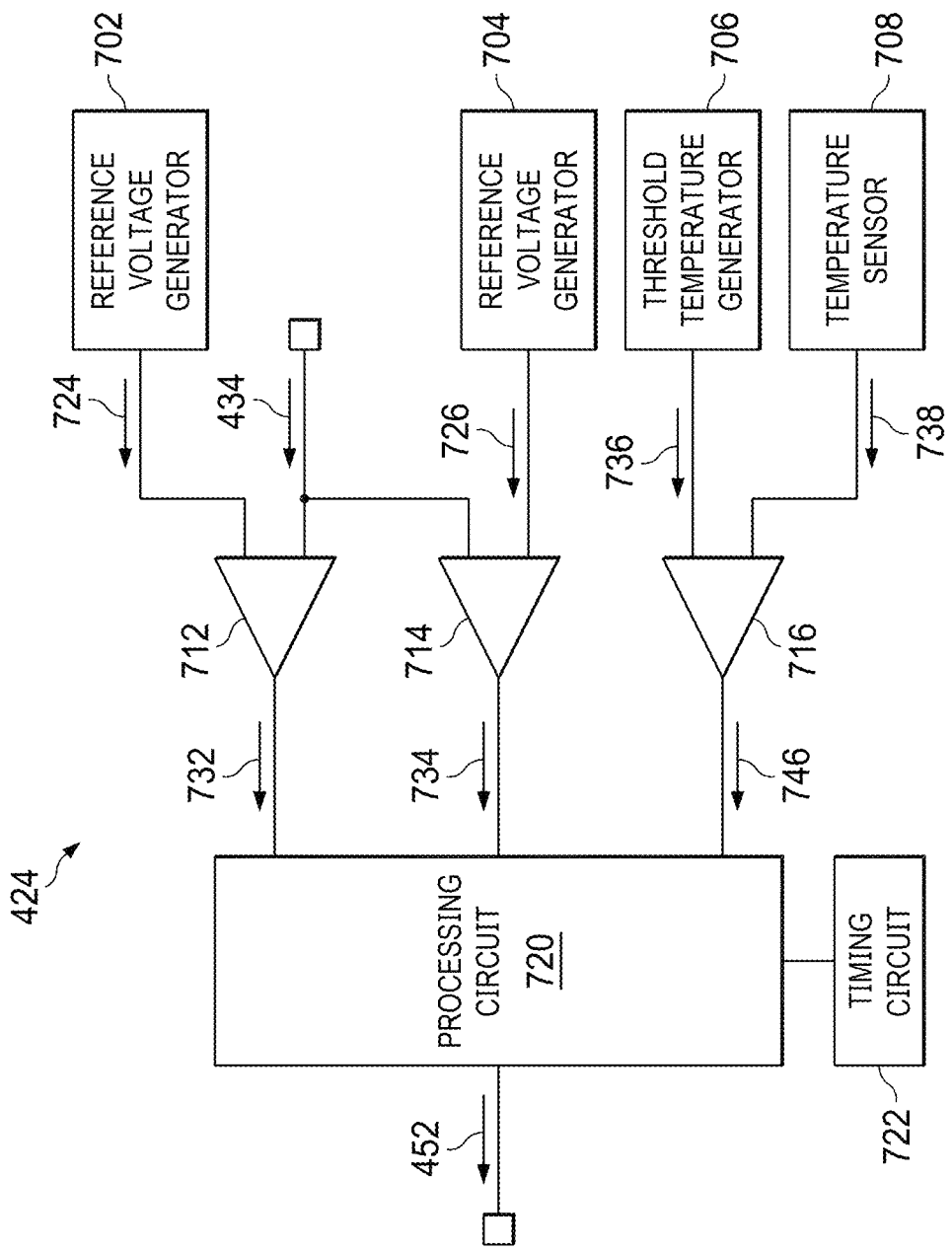
Figure 8:
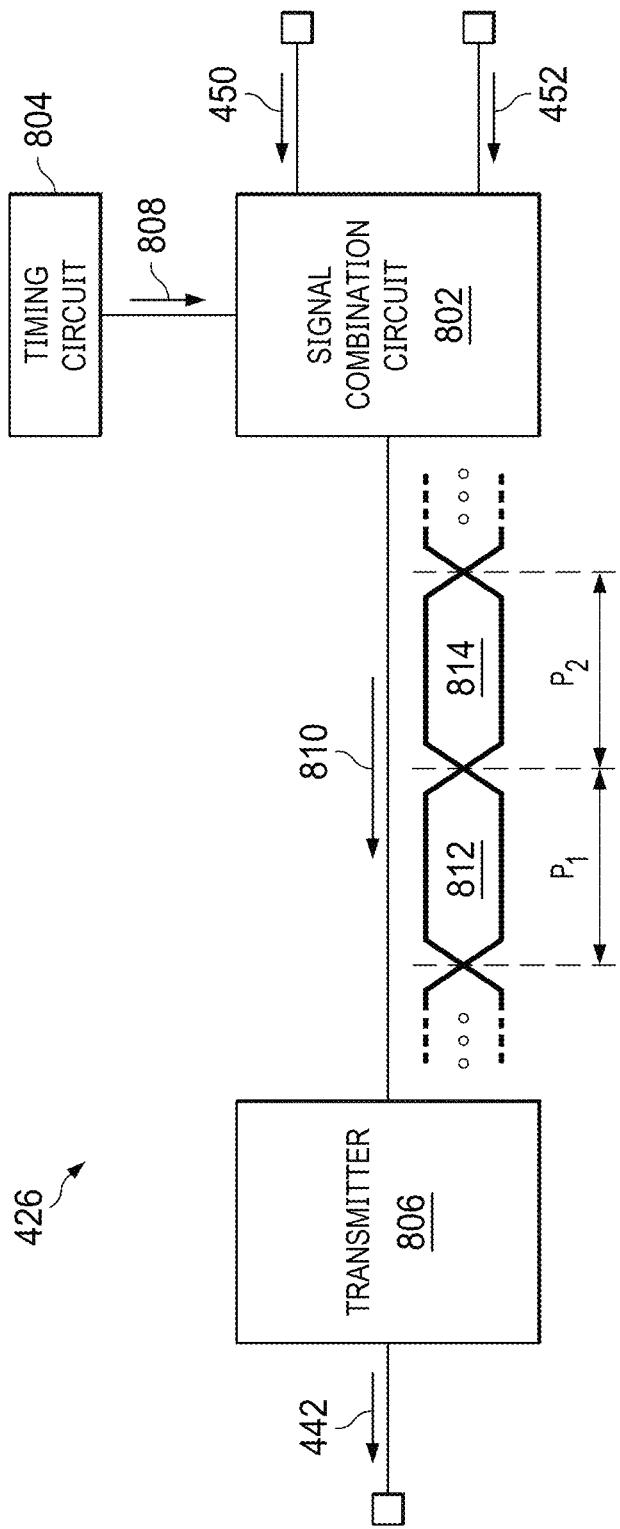

FIG. 6, FIG. 7, and FIG. 8 are schematic diagrams of example internal components of secondary side circuit 404. FIG. 6 is a schematic diagram of an example feedback voltage processor 422. Referring to FIG. 6, feedback voltage processor 422 can include a target voltage generator 602 and a processing circuit 604. Target voltage generator 602 can include a voltage source to generate a target voltage 606. As to be described below, target voltage generator 602 can include a programmable voltage source (e.g., a digital-to-analog converter (DAC)) that can be programmed to generate a variable target voltage 606 to support a soft start operation in power converter 400.

Also, processing circuit 604 can generate feedback indicator 450 based on a comparison between target voltage 606 and feedback voltage 434, which can be a scaled version of $V_{out}$. In a case where feedback indicator 450 is to be provided to controller 412 as a hysteretic control signal, processing circuit 604 can include a comparator, and the state of feedback indicator 450 can indicate whether feedback voltage 434 exceeds target voltage 606. In a case where feedback indicator 450 represents an error/difference between feedback voltage 434 and target voltage 606, processing circuit 604 can include an error amplifier to determine a difference between feedback voltage 434 and target voltage 606, and generate a feedback error signal having an amplitude that represents the difference. Processing circuit 604 can also include an analog-to-digital converter (ADC) to convert the difference into a code that represents the feedback error signal, and provide the code as feedback indicator 450.

FIG. 7 is a schematic diagram of an example control message generator 424. Referring to FIG. 7, control message generator 424 can include reference voltage generators 702 and 704, a temperature reference generator 706, and a temperature sensor 708. Control message generator 424 can also include comparators 712, 714, and 716, a processing circuit 720, and a timing circuit 722. Reference voltage generators 702 and 704 can generate respective reference voltages 724 and 726 to be compared against feedback voltage 434, where reference voltages 724 and 726 can represent a target voltage range for $V_{out}$. Comparator 712 can compare feedback voltage 434 with reference voltage 724 to generate a decision signal 732, and comparator 714 can compare feedback voltage 434 with reference voltage 726 to generate a decision signal 734. Based on the states of decision signals 732 and 734, processing circuit 720 can determine whether $V_{out}$ is within the target voltage range. If $V_{out}$ is within the target voltage range, processing circuit 720 can provide control message 452 including the power good message, which allows the host to enable power gate 430 and/or circuit blocks in load 104.

Also, if $V_{out}$ is outside the target voltage range, processing circuit 720 can determine the duration in which $V_{out}$ is outside the target voltage range, based on a timing signal from timing circuit 722. Before a threshold duration of time is reached, processing circuit 720 can provide control message 452 including the power bad message. If the threshold duration of time is reached and $V_{out}$ remains outside the target voltage range, processing circuit 720 can provide control message 452 including the fault message, which can cause controller 412 to disable power stage 112.

Further, comparator 716 can compare a threshold temperature signal 736 provided by threshold temperature generator 706 with a temperature measurement signal 738 provided by temperature sensor 708 to generate a decision signal 746. Temperature measurement signal 738 can represent a temperature of secondary side circuit 404 and/or load 104, and both threshold temperature signal 736 and temperature measurement signal 638 can be in the form of voltages. If a state of decision signal 746 indicates that the temperature exceeds the temperature threshold, and decision signal 746 remains in that state over the threshold duration of time, processing circuit 720 can also provide control message 452 including the fault message, which can cause controller 412 to disable power stage 112 as described above.

FIG. 8 is a schematic diagram of an example status signal generator 426. Referring to FIG. 8, status signal generator 426 can include a signal combination circuit 802, a timing circuit 804, and a transmitter 806. Signal combination circuit 802 can receive feedback indicator 450 (from feedback voltage processor 422) and control message 452 (from control message generator 424), and generate a data signal 810 including a serial stream of symbols representing feedback indicator 450 and control message 452. Transmitter 806 can generate status signal 442 based on the logical states of the symbols of data signal 810 and transmit status signal 442 over communication channel 440.

Signal combination circuit 802 can receive a clock signal 808 from timing circuit 804 and synchronize both feedback indicator 450 and control message 452 to clock signal 808. Signal combination circuit 802 can also generate symbols representing the synchronized feedback indicator 450 and control message 452, and insert the symbols into data signal 810 at symbol periods defined based on clock signal 808. For example, signal combination circuit 802 may insert symbols 812 representing feedback indicator 450 (or control message 452) into data signal 810 within period $P_1$, and insert symbols 814 representing control message 452 (or feedback indicator 450) into data signal 810 within period $P_2$.

Figure 9:
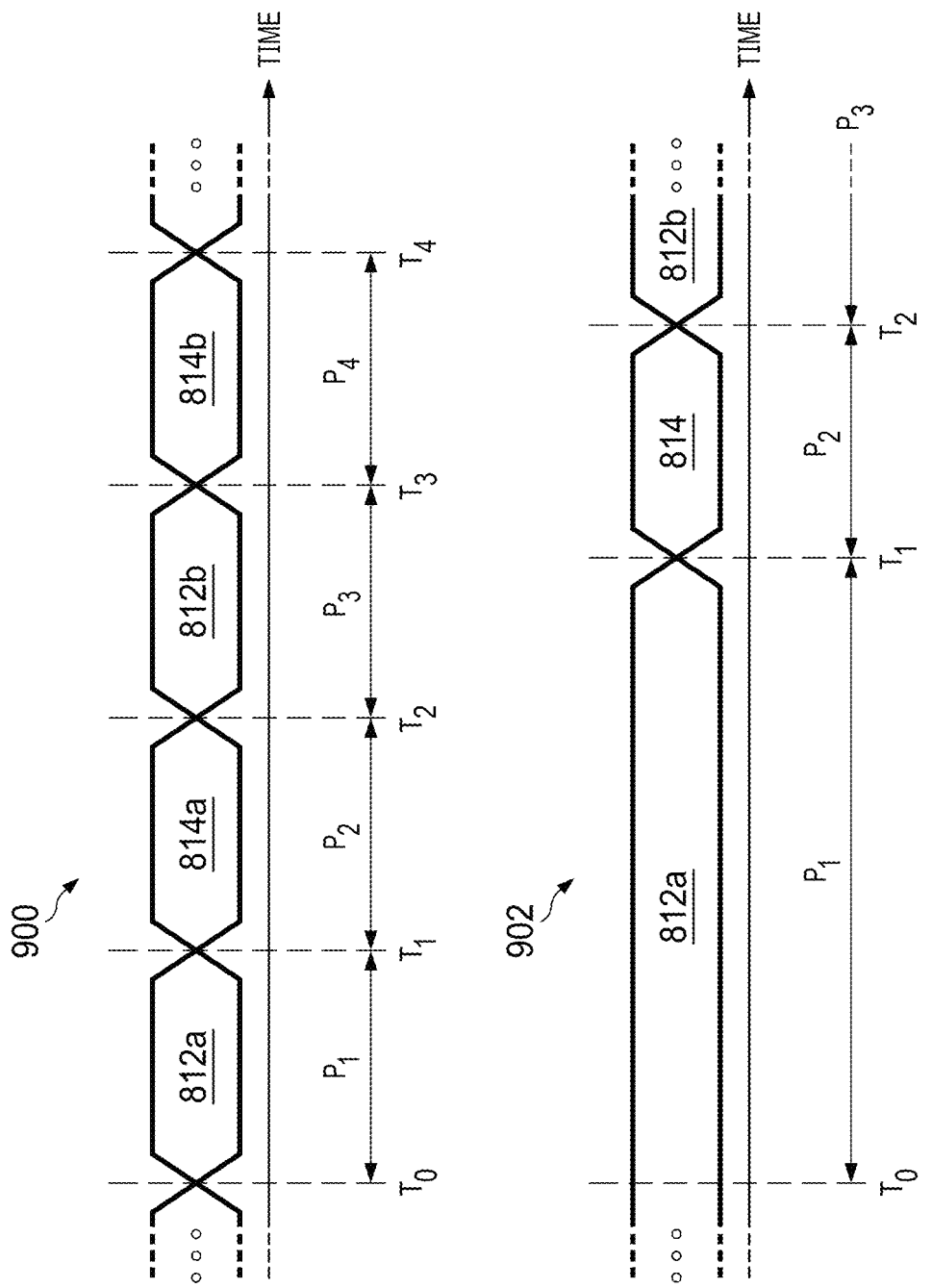
FIGS. 9 through 12 are waveform diagrams that illustrate example signals transmitted by the secondary side circuit of FIGS. 6-8.

Signal combination circuit 802 can determine the order of transmission of feedback indicator 450 and control message 452 in data signal 810 based on various techniques, such as based on a predetermined schedule, or based on priority. FIG. 9 are waveform diagrams that illustrate example interleaving patterns of feedback indicator 450 and control message 452 in data signal 810. In FIG. 9, symbols 812 can represent feedback indicator 450, and symbols 814 can represent control message 452.

Referring to FIG. 9, in pattern 900, symbols 812 and 814 can be interleaved following a predetermined schedule. At the scheduled time of transmission, signal combination circuit 802 can receive one of feedback indicator 450 or control message 452, convert the sampled signal into symbols, and insert the symbols into data signal 810. For example, feedback indicator 450 is to be transmitted within period $P_1$ between $T_0$ and $T_1$ and within period $P_3$ between $T_2$ and $T_3$, and control message 452 is to be transmitted within period $P_2$ between $T_1$ and $T_2$ and within period $P_4$ between $T_3$ and $T_4$. Accordingly, within periods $P_1$ and $P_3$, signal combination circuit 802 can receive feedback indicator 450, generate respective symbols 812a and 812b based on the state of the feedback indicator, and insert symbols 812a and 812b into data signal 810 within periods $P_1$ and $P_3$. Also, within periods $P_2$ and $P_4$, signal combination circuit 802 can receive control message 452, generate respective symbols 814a and 814b based on the state of the feedback indicator, and insert symbols 814a and 814b into data signal 810 within periods $P_2$ and $P_4$.

In some examples, signal combination circuit 802 can determine the transmission order of symbols 812 and 814 based on priority, where signal combination circuit 802 can interrupt the transmission of a lower priority symbol in data signal 810 in order to transmit the higher priority symbol. For example, referring to pattern 902, signal combination circuit 802 may interrupt the transmission of symbols 812a at $T_1$ to insert symbols 814 into data signal 810, based on symbols 814 (representing control message 452) having a higher priority than symbols 812a (representing feedback indicator 450). After transmission of symbols 814, signal combination circuit 802 can insert symbols 812b into data signal 810.

Signal combination circuit 802 may determine that control message 452 has a higher transmission priority than feedback indicator 450 in various operation conditions. For example, as described above, controller 412 may start a timer responsive to receiving an active enable signal 419, and may disable/shut down power stage 112 if it does not receive the power good message before the timer expires. Accordingly, responsive to generating the first power good message after power converter 400 starts up, signal combination circuit 802 may prioritize transmission of the power good message to reduce the likelihood of controller 412 disabling power stage 112. Referring again to pattern 902, signal combination circuit 802 may interrupt the transmission of symbols 812a representing feedback indicator 450 at $T_1$, insert symbols 814 representing the power good message in data signal 810 between $T_1$ and $T_2$, and then transmit symbols 812b representing feedback indicator 450 starting at $T_2$.

In some examples, if controller 412 detects no state change in status signal 442 for a threshold duration of time, controller 412 may disable power stage 112. Accordingly, signal combination circuit 802 can measure a duration of time in which feedback indicator 450 is in a particular state based on clock signal 808. If the duration of time reaches or exceeds the threshold duration of time, signal combination circuit 802 can insert symbols 814 representing a message into data signal 810 as a heartbeat signal, to avoid controller 412 disabling power stage 112 due to suspected inactivity of secondary side circuit 404. Accordingly, if feedback indicator 450 remains in the particular state, signal combination circuit 802 can insert a message into data signal 810 between intervals defined by the threshold duration. Referring to pattern 902, signal combination circuit 802 may interrupt the transmission of symbols 812a representing feedback indicator 450 at $T_1$ due to feedback indicator 450 staying at a particular state for the threshold duration of time, and insert symbols 814 representing a message in data signal 810 between $T_1$ and $T_2$. Signal combination circuit 802 can determine a state of control message 452 when the threshold duration is reached, and insert one of a power good message, a power bad message, or a fault message as the heartbeat signal based on control message 452.

In some examples, signal combination circuit 802 can also generate one or more symbols for status signal 442 representing a combination of feedback indicator 450 and control message 452. For example, both signal combination circuit 802 and status signal receiver 414 can store a mapping table that maps between different symbols and different combinations of states of feedback indicator 450 and types of control message 452. Responsive to receiving feedback indicator 450 and control message 452, signal combination circuit 802 can determine a state of feedback indicator 450 and a type of control message 452. From the mapping table, signal combination circuit 802 can determine one or more symbols mapped to the particular state of feedback indicator 450 and the particular type of control message 452, and include the one or more symbols in data signal 810. Also, upon receiving status signal 442 including the one or more symbols, status signal receiver 414 can decode the symbols using the mapping table to obtain the state of feedback indicator 450 and the type of control message 452 represented by the symbols.

In some examples, signal combination circuit 802 can insert one or more pulses in data signal 810 as symbols to represent feedback indicator 450 and control message 452. The pulses of feedback indicator 450 can represent, for example, a result of a comparison between feedback voltage 434 and target voltage 606, or a code representing an error/difference between feedback voltage 434 and target voltage 606. Also, different types of control messages 452 (e.g., power good message, power bad message, and fault message) can be represented by different number of pulses/symbols. The pulses of control messages 452 can have a much higher bandwidth than feedback indicator 450, and adjacent state transitions in control message 452 are separated by a much shorter time period than adjacent state transitions in feedback indicator 450. Also, signal combination circuit 802 can set the voltage state of the pulses to be opposite to the voltage state of symbols of feedback indicator 450 preceding the symbols of control message 452. Such arrangements can simplify the extraction of feedback indicator 450 and control message 452 from status signal 442, where controller 412 can apply a low pass filter to filter out the pulses in data signal 810, and extract feedback indicator 450 from the filtered data signal.

Figure 10:
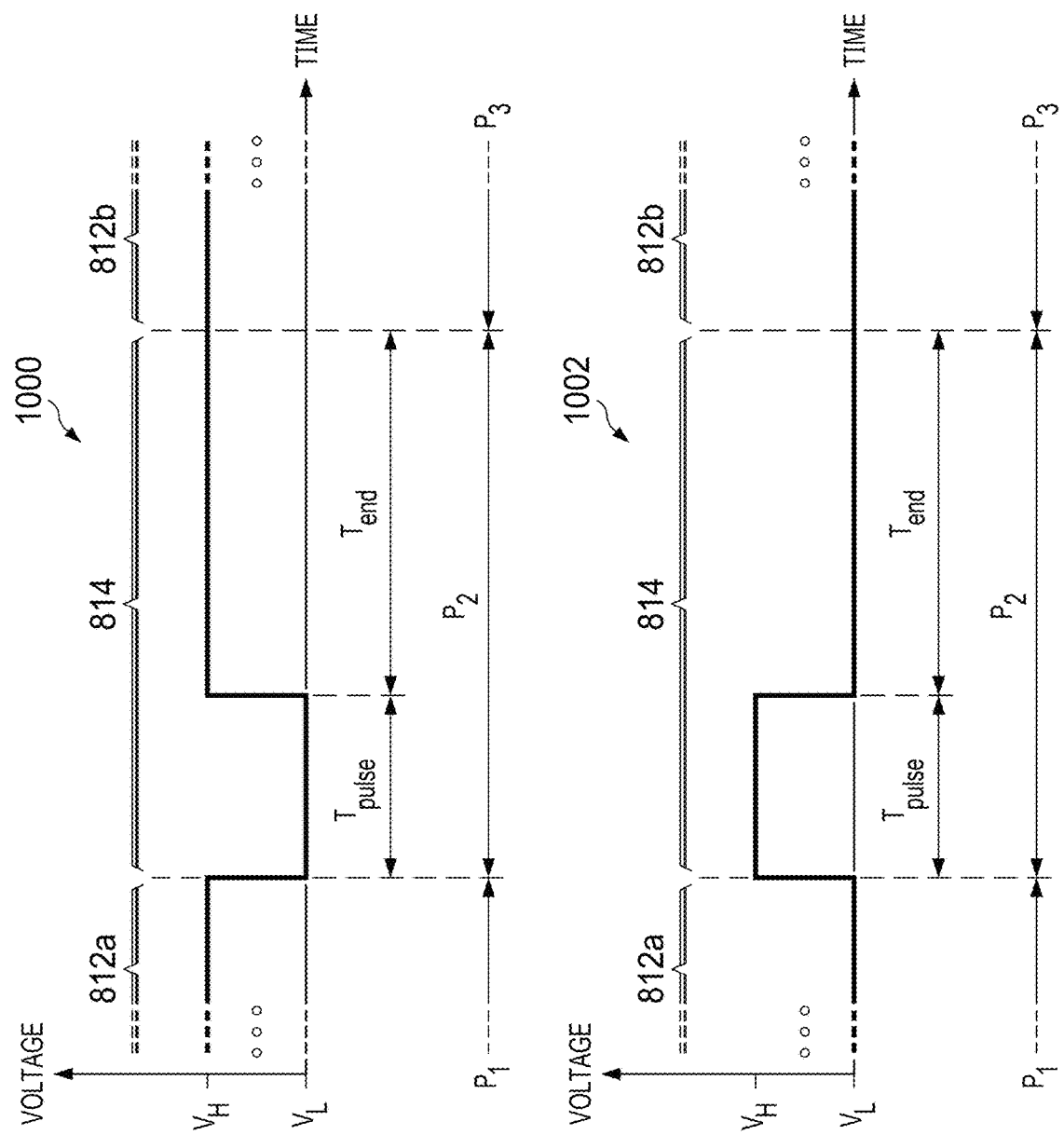
Figure 11:
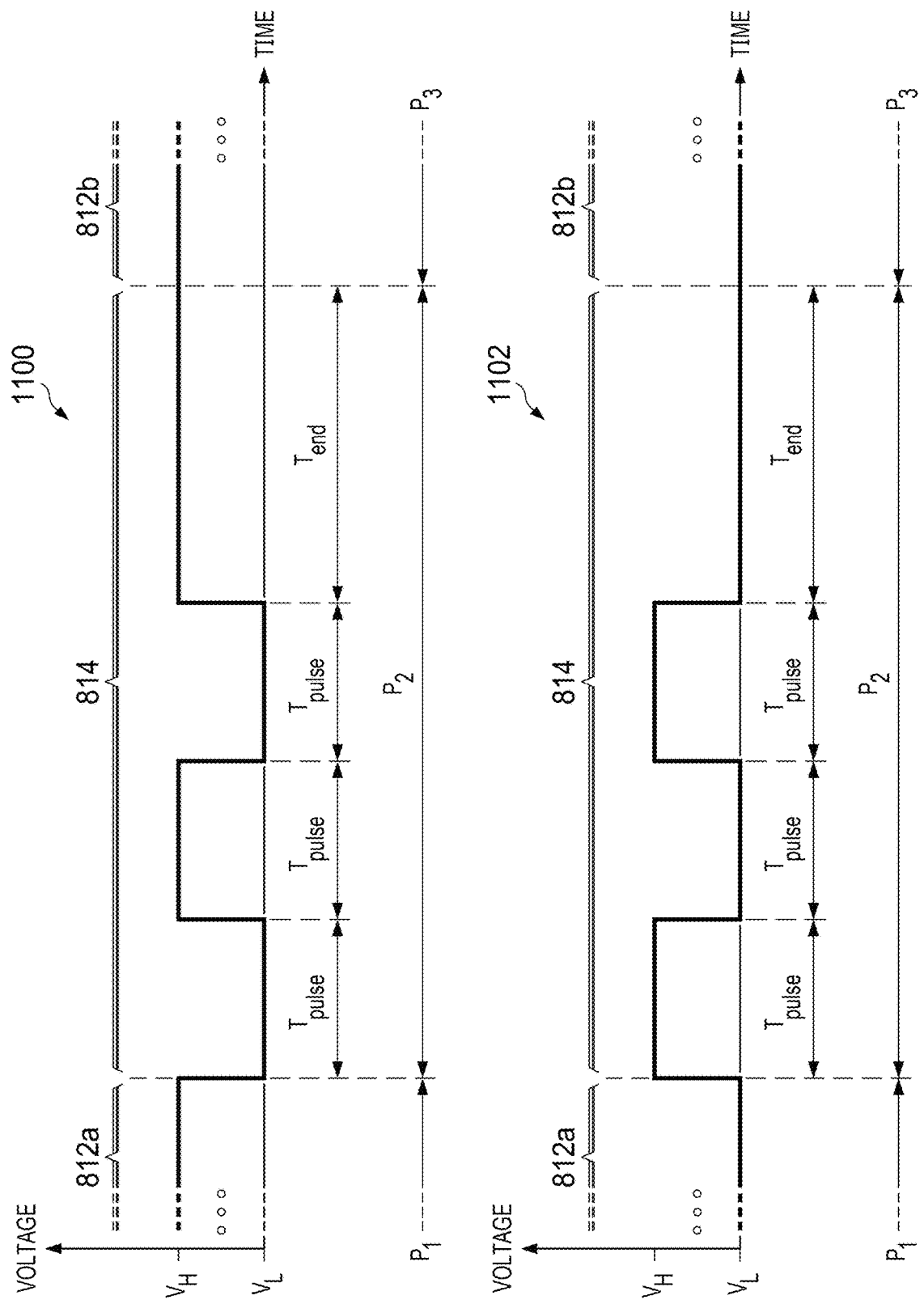
Figure 12:
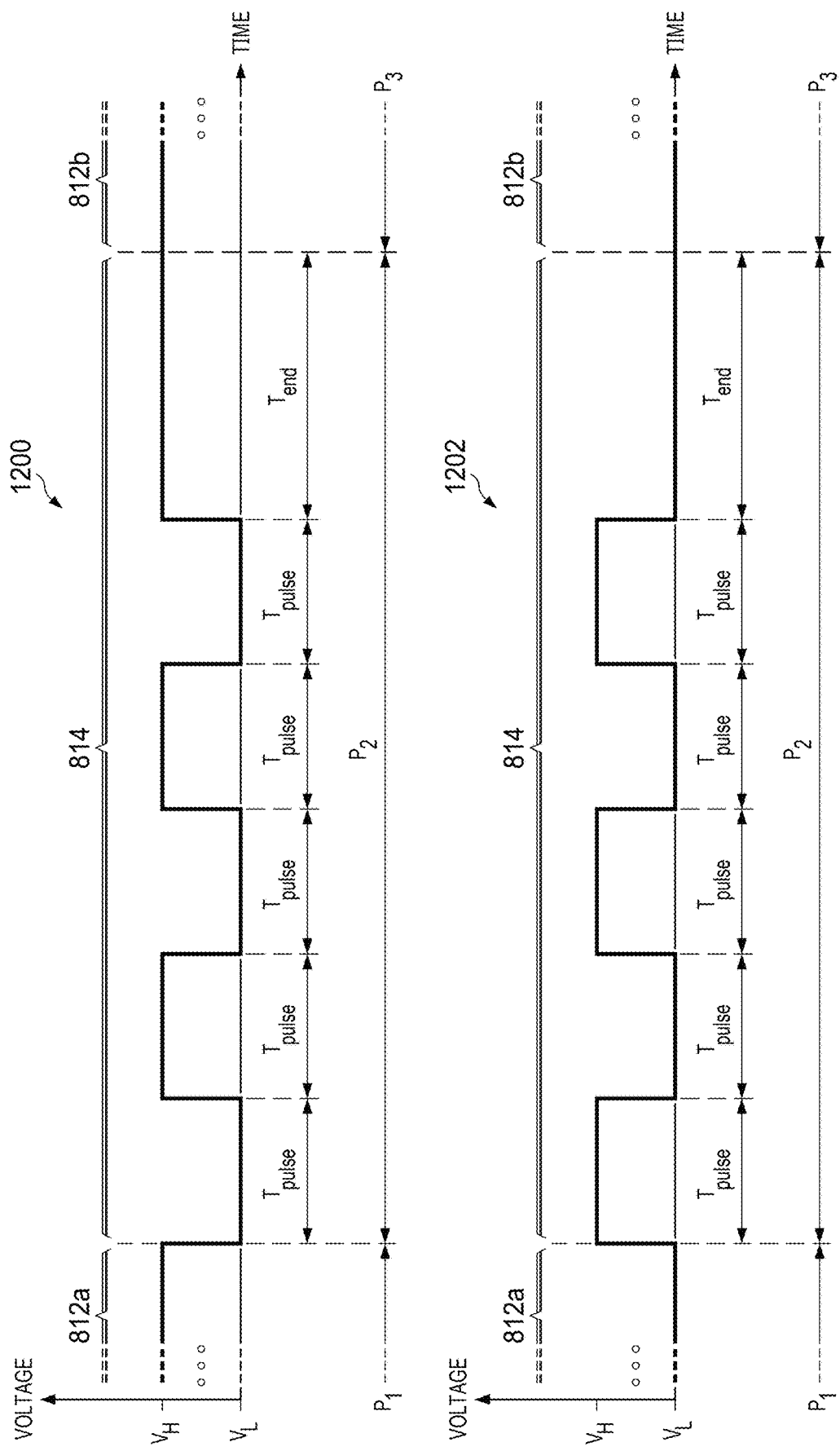

FIG. 10, FIG. 11, and FIG. 12 are waveform diagrams of example data signal 810 generated by signal combination circuit 802. In FIGS. 10 through 12, data signal 810 can include symbols 812a, 812b, and 814, where symbols 812 can represent a hysteretic control signal. Data signal 810 can have one of two voltage states $V_L$ and $V_H$ each representing different logical states, where $V_L$ can represent a logical zero or a de-asserted state, and $V_H$ can represent a logical one or an asserted state. Symbols 812a and 812b can span respectively periods of $P_1$ and $P_3$, and symbols 814 can span a period of $P_2$.

FIG. 10 illustrates waveform graphs 1000 and 1002 of example symbols 812a and 812b representing feedback indicator 450 and example symbols 814 representing one type of control message 452, such as a power good message. In FIG. 10, symbols 814 can include a symbol including a single pulse having a pulse width $T_{pulse}$, followed by an end symbol having a width of $T_{end}$, which can have a constant relationship with $T_{pulse}$ across different kinds of control messages. The pulse width $T_{pulse}$ of symbols 814 can be smaller than the minimum time between state transitions in symbols 812 (of feedback indicator 450), to allow controller 412 to distinguish between feedback indicator 450 and control message 452.

FIG. 11 illustrates waveform graphs 1100 and 1102 of example symbols 814 representing another type of control message 452, such as a power bad message. In FIG. 11, symbols 814 can include a symbol having two pulses each having a pulse width $T_{pulse}$, followed by an end symbol having a width of $T_{end}$. Further, FIG. 12 illustrates waveform graphs 1200 and 1202 of example symbols 814 representing another type of control message 452, such as a fault message. In FIG. 12, symbols 814 can include a symbol including three pulses each having a pulse width $T_{pulse}$, followed by an end symbol having a width of $T_{end}$. In some examples, the duration of $T_{end}$ can be a multiple of the duration of $T_{pulse}$. For example, $T_{pulse}$ can span three cycles of clock signal 808, and $T_{end}$ can span six clock cycles of clock signal 808.

In FIGS. 11 and 12, adjacent pulses are also separated by a time period $T_{pulse}$, in which data signal 810 has an opposite voltage state from the pulses. Also, the pulses of symbols 814 can have opposite voltage states to symbols 812a and 812b. For example, in graphs 1000, 1100, and 1200, symbols 812a and 812b can be in the $V_H$ state and symbols 814 can be in the $V_L$ state. Also, in graphs 1002, 1102, and 1202, symbols 812a and 812b can be in the $V_L$ state and symbols 814 can be in the $V_H$ state.

Figure 13:
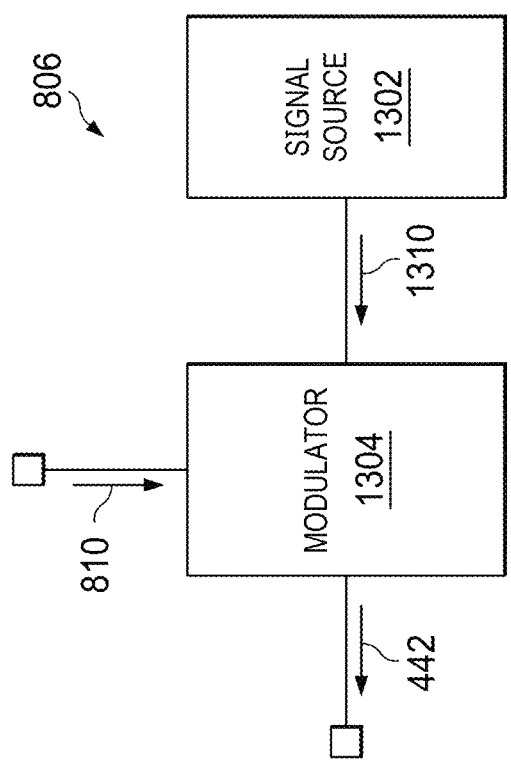
FIG. 13 is a schematic diagram of example internal components of the example secondary side circuit of FIGS. 6-8.
Figure 14:
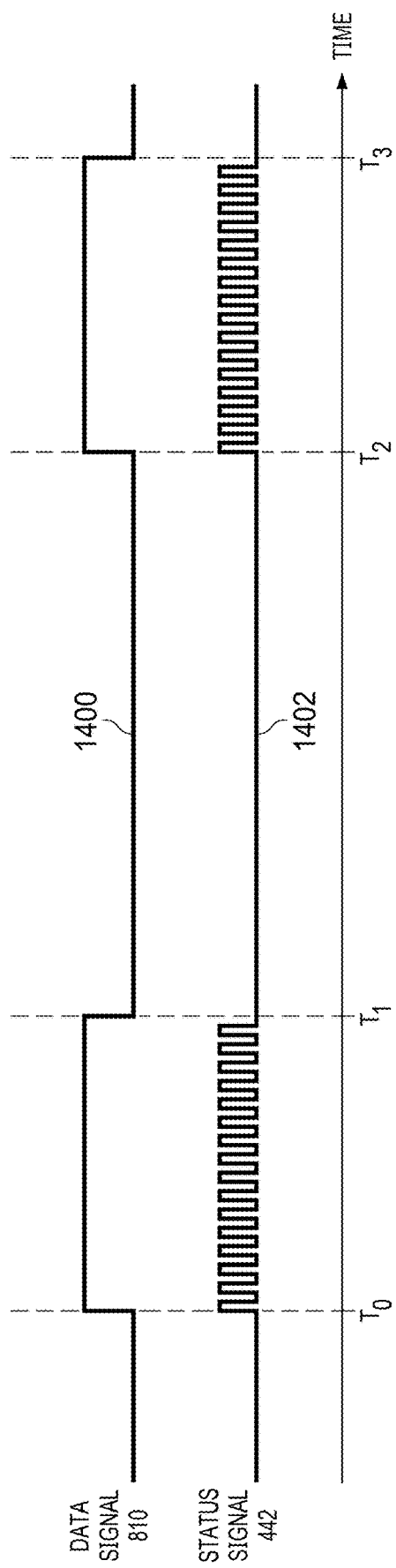
FIG. 14 are waveform diagrams that illustrate example signals provided by the example secondary side circuit of FIGS. 6-8.

FIG. 13 is a schematic diagram of example internal components of transmitter 806, and FIG. 14 include waveform diagrams of example data signal 810 and status signal 442. Referring to FIG. 13, transmitter 806 can include a signal source 1302 and a modulator 1304. Modulator 1304 can receive data signal 810 including the symbols for feedback indicator 450 and control message 452 from signal combination circuit 802. Modulator 1304 can also receive a signal 1310 from signal source 1302. Modulator 1304 can modulate signal 1310 based on the voltage states of the symbols, and provide the modulated signal as status signal 442.

Signal source 1302 can provide different types of signal 1310 depending on the properties of communication channel 440. For example, in a case where communication channel 440 includes a capacitive channel provided by capacitor 502 of FIG. 5, capacitor 502 can be configured as a high pass filter. Signal source 1302 can provide an oscillating carrier signal 1310 having a higher switching frequency than data signal 810, and modulator 1304 can perform an on-off keying modulation operation on carrier signal 1310. Because capacitor 502 is configured as a high pass filter, it can transmit a high frequency carrier signal 1310 with reduced or no loss.

FIG. 14 includes waveform diagrams 1400 and 1402. Waveform diagram 1400 illustrates an example data signal 810, and waveform diagram 1402 illustrates an example status signal 442 generated by modulator 1304 responsive to the example data signal 810. Referring to FIG. 14, between times $T_0$ and $T_1$ and between times $T_2$ and $T_3$ when data signal 810 is in the $V_H$ state and represents one or more logical one symbols, modulator 1304 can allow carrier signal 1310 to pass through as status signal 442. Also, when data signal 810 is in the $V_L$ state and represents one or more logical zero symbols between $T_2$ and $T_3$, modulator 1304 can block out carrier signal 1310 from status signal 442. Accordingly, signal status receiver 414 of primary side circuit 402 can recover the symbols from status signal 442 by detecting the presence or absence of carrier signal 1310 in status signal 442, where the presence of carrier signal 1310 can indicate a logical one and the absence of carrier signal 1310 can indicate a logical zero.

Referring again to FIG. 13, signal source 1302 can provide other types of signal 1310 for other types of communication channel 440. For example, in a case where communication channel 440 includes an optical channel (e.g., provided by optical waveguide 506 of FIG. 5), signal source 1302 can include a light source (e.g., a laser source) to provide a light signal 1310. Modulator 1304 can transmit or block light signal 1310 based on the state of data signal 810, and signal status receiver 414 of primary side circuit 402 can recover the symbols from status signal 442 by detecting the presence or absence of light signal 1310 in status signal 442. Also, in a case where communication channel 440 includes a magnetic channel (e.g., provide by transformer 504 of FIG. 5), signal source 1302 can include a direct current (DC) voltage source to provide a DC voltage 1310, and modulator 1304 can modulate the DC voltage 1310 to provide status signal 442. Signal status receiver 414 of primary side circuit 402 can recover the symbols from status signal 442 by detecting the voltage state of status signal 442. In some examples, signal source 1302 can also provide an oscillating carrier signal 1310, which can be modulated by modulator 1304, for transmission of status signal 442 over the magnetic channel.

Figure 15:
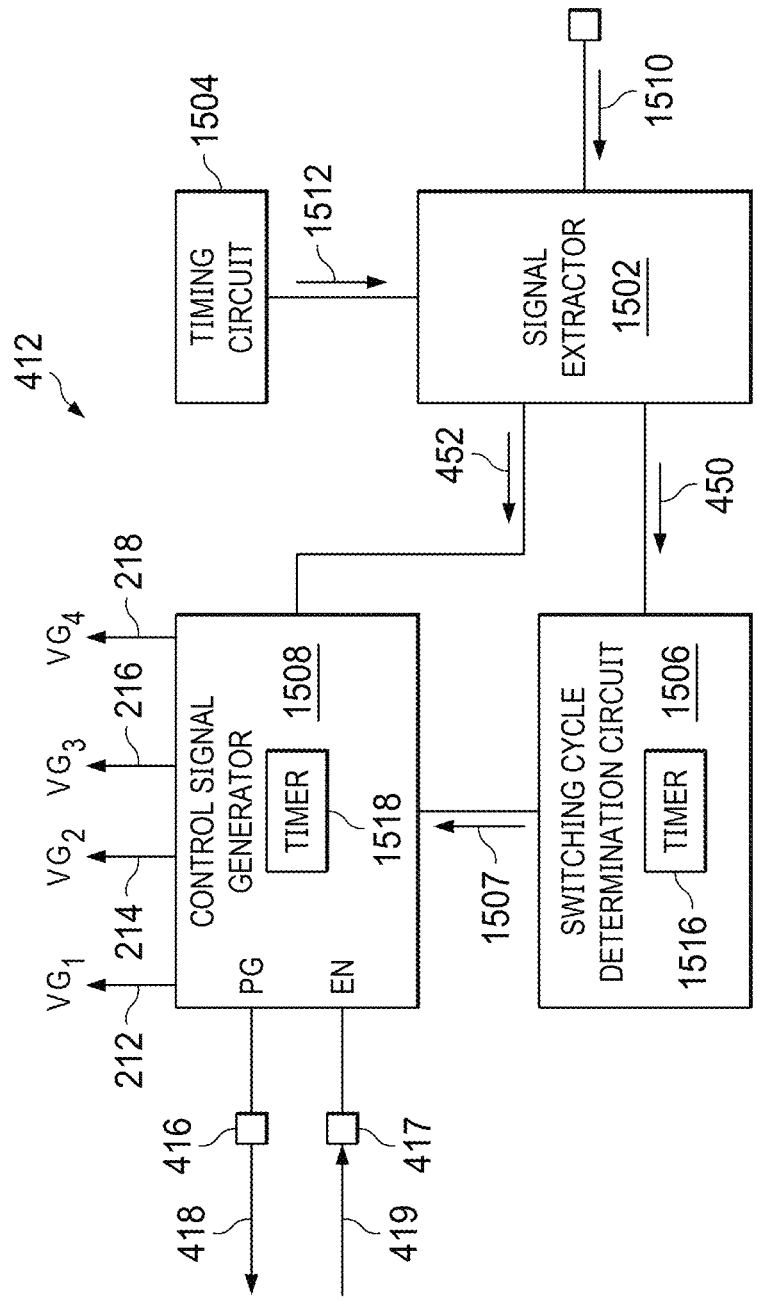
FIG. 15 is a schematic diagram of example internal components of a primary side circuit of the example power converter of FIG. 4.

FIG. 15 is a schematic diagram of example internal components of controller 412 of primary side circuit 402. Referring to FIG. 15, controller 412 can include a signal extractor 1502, a timing circuit 1504, a switching cycle determination circuit 1506, and a control signal generator 1508. Signal extractor 1502 can receive a data signal 1510, which can include symbols recovered from status signal 442 by signal status receiver 414. Signal extractor 1502 can also receive a clock signal 1512 from timing circuit 1504. Clock signal 1512 can have the same frequency as clock signal 808 of status signal generator 426 of secondary side circuit 404.

Signal extractor 1502 can extract data signal 1510 from status signal 442. In a case where status signal 442 includes a carrier signal modulated by the symbols of feedback indicator 450 and control message 452, signal extractor 1502 can set data signal 1510 to a first state (e.g., $V_H$ or asserted state) in a signal period where the carrier signal is detected, and set data signal 1510 to a second state (e.g., $V_L$ state) in a signal period where the carrier signal is not detected. In a case where status signal 442 are in the form of pulses, signal extractor 1502 can set the state of data signal 1510 based on the amplitude of status signal 442. Signal extractor 1502 can also synchronize data signal 1510 with clock signal 1512, and perform filtering operations on the synchronized data signal 1510 to remove noise. Signal extractor 1502 can also separate the symbols of feedback indicator 450 from the symbols of control message 452 by performing another low pass filtering, based on the symbols of feedback indicator 450 having a lower bandwidth than those of control messages 452.

From the extracted symbols, signal extractor 1502 can determine a state of feedback indicator 450. For example, in a case where feedback indicator 450 includes a hysteretic control signal, signal extractor 1502 can provide feedback indicator 450 having a first state (e.g., $V_H$ state in FIGS. 10-12) for an extracted symbol representing a logical one, and provide feedback indicator 450 having a second state (e.g., $V_L$ state in FIGS. 10-12) for an extracted symbol representing a logical zero. Also, in a case where feedback indicator 450 includes a code representing an error/difference between feedback voltage 434 and target voltage 606, signal extractor 1502 can determine the code from the symbol, and provide the code as feedback indicator 450. Signal extractor 1502 can also search for symbols representing different types of control messages 452 by detecting a number of transitions each separated by $T_{pulse}$, and by detecting the end symbol.

Switching cycle determination circuit 1506 can generate a switching cycle signal 1507 that represents the switching cycles of power stage 112. The state of switching cycle signal 1507 can define the on-time and off-time periods of each switching cycle. For example, switching cycle signal 1507 having a first state (e.g., an asserted state) can indicate that power stage 112 is to be turned on, and switching cycle signal 1507 having a second state (e.g., a de-asserted state) can indicate that power stage 112 is to be turned off. Switching cycle determination circuit 1506 can set the duty cycle of switching cycle signal 1507 (and the on-time and off-time periods durations) based on feedback indicator 450 extracted by signal extractor 1502. For example, if feedback indicator 450 is a hysteretic control signal that indicates whether feedback voltage 434 exceeds a target voltage, switching cycle determination circuit 1506 can extend the on-time period of a cycle of switching cycle signal 1507 responsive to feedback indicator 450 indicating that feedback voltage 434 is below the target voltage. Also, switching cycle determination circuit 1506 can start the off-time period of that cycle (or the next cycle) responsive to feedback indicator 450 indicating that feedback voltage 434 is above the target voltage. As another example, if feedback indicator 450 includes a code that represents a difference/error between feedback voltage 434 and the target voltage, switching cycle determination circuit 1506 can determine the durations of the on-time and off-time periods based on the code included in feedback indicator 450.

Also, in certain operation conditions, switching cycle determination circuit 1506 can disable power stage 112 by setting switching cycle signal 1507 in the second/de-asserted state. For example, switching cycle determination circuit 1506 can include a timer 1516 to measure a duration of time in which feedback indicator 450 remains at a particular state (e.g., in the $V_H$ or $V_L$ state). If the duration exceeds a threshold, switching cycle determination circuit 1506 can disable power stage 112 by setting switching cycle signal 1507 in the second/de-asserted state.

Further, control signal generator 1508 can receive and handle control message 452 extracted by signal extractor 1502, and can also provide control signals 212 through 218 (VG1 through VG4) based on switching cycle signal 1507 and control message 452. For example, responsive to detecting the power good message in control message 452, control signal generator 1508 can set power good signal 418 at output voltage status terminal 416 to a first state (e.g., an asserted state) to indicate to the host that $V_{out}$ is within the target voltage range. Control signal generator 1508 can also set power good signal 418 to a second state (e.g., a de-asserted state) responsive to, for example, detecting the power bad message or the fault message in control message 452, or otherwise determining to disable power stage 112.

Also, if control message 452 does not include a fault message, control signal generator 1508 can generate control signals $VG_1$ through $VG_4$ responsive to the state of switching cycle signal 1507. For example, referring again to FIG. 3, responsive to switching cycle signal 1507 being in the first state, which can indicate the on-time period of a switching cycle, control signal generator 1508 can generate control signals $VG_1$ through $VG_4$ as multi-cycle control signals to transfer power from power source 102 to load 104. Also, responsive to switching cycle signal 1507 being in the second state, which can indicate the off-time period of the switching cycle (or another switching cycle), control signal generator 1508 can de-assert $VG_1$ and $VG_3$ and assert $VG_2$ and $VG_4$ to disconnect load 104 from power source 102. In some examples, switching cycle signal 1507 can provide the duty cycle information, and control signal generator 1508 can determine the switching frequency information (e.g., based on programming from the host), and generate control signals $VG_1$ through $VG_4$ based on the switching frequency information and the duty cycle information.

Control signal generator 1508 can also override switching cycle signal 1507 and disable power stage 112 in certain operation conditions. For example, responsive to detecting a potential fault condition, control signal generator 1508 can disable power stage 112 by de-asserting $VG_1$ through $VG_4$ to power stage 112. Control signal generator 1508 can detect the potential fault condition based on, for example, detecting a fault message in control message 452. In some examples, control signal generator 1508 can also include a timer 1518. Control signal generator 1508 can start timer 1518 responsive to receiving an active enable signal 419 via enable terminal 417. If control signal generator 1508 does not detect the power good message in control message 452 prior to the expiration of timer 1518, control signal generator 1508 can disable power stage 112.

In some examples, power converter 400 can support a respective soft start operation in each of primary side circuit 402 and secondary side circuit 404. As part of the soft start operations, power converter 400 can increase $V_{out}$ in a sequence of target voltages. Also, during the soft start operation, controller 412 can begin adjusting $V_{out}$ with an open loop operation, and then switch to adjusting $V_{out}$ with a closed loop operation based on feedback indicator 450 after receiving status signal 442, which can indicate that secondary side circuit 404 has been fully powered up (e.g., by drawing power from rectifier 116) and is operational. With such arrangements, the ramping up of $V_{out}$ can be performed at a slower pace, which allows for reduced driving capabilities and reduced sizes of switches 202 through 208 of power stage 112, and improve the bandwidth and efficiency of power converter 400. Also, because controller 412 adjusts $V_{out}$ with a closed loop operation after secondary side circuit 404 fully powers up and feedback indicator 450 becomes reliable, the precision in providing a specific $V_{out}$ to load 104 can also be improved. All these can improve the performance of power converter 400.

Figure 16:
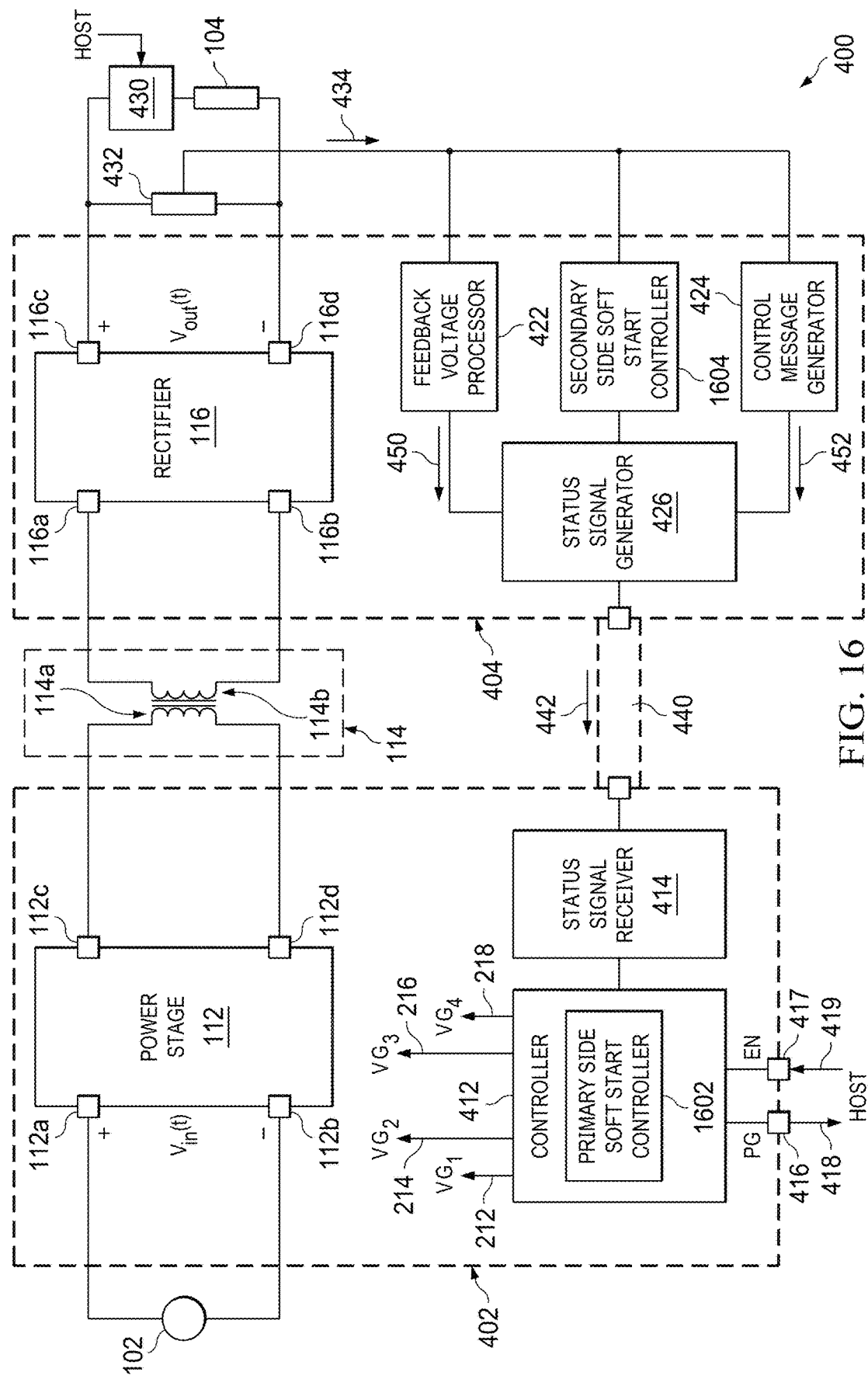
FIGS. 16, 17, and 18 are schematic diagrams of an example power converter that support soft-start operations.

FIG. 16 is a schematic diagram of example internal components of power converter 400 to support the soft start operations. Referring to FIG. 16, controller 412 can include a primary side soft start control circuit 1602, and secondary side circuit 404 can include a secondary side soft start control circuit 1604. Primary side soft start control circuit 1602 can support a primary side soft start operation, and secondary side soft start control circuit 1604 can support a secondary side soft start operation.

Figure 17:
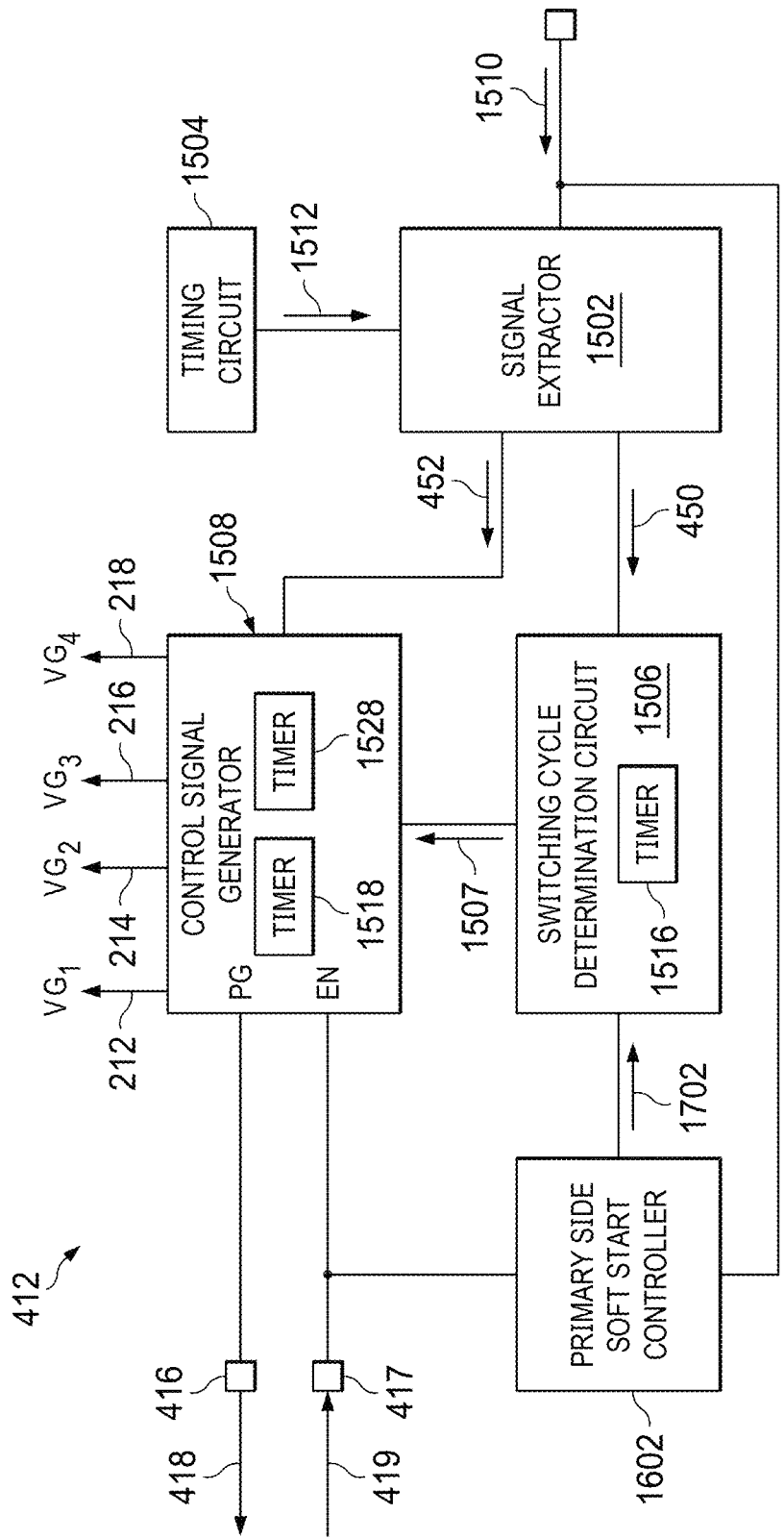

FIG. 17 is a schematic diagram of example internal components of controller 412 including primary side soft start control circuit 1602. As part of the primary side soft start operation on primary side circuit 402, primary side soft start control circuit 1602 can provide control signals to power stage 112 to increase $V_{out}$ in an open loop operation before secondary side circuit 404 powers up.

Specifically, primary side soft start control circuit 1602 can be coupled to enable terminal 417 and switching cycle determination circuit 1506 and can also receive data signal 1510 from status signal receiver 414. In some examples, primary side soft start control circuit 1602 may also be coupled to control signal generator 1508. Responsive to receiving enable signal 419 at enable terminal 417, primary side soft start control circuit 1602 can start the open loop operation and provide an open loop control signal 1702 to switching cycle determination circuit 1506, which can set the switching frequency and duty cycle of switching cycle signal 1507 based on open loop control signal 1702. In some examples, control signal generator 1508 can also set the switching frequencies of control signals $VG_1$ through $VG_4$ based on open loop control signal 1702, and set the states of the control signals based on the duty cycle of switching cycle signal 1507. The control signals $VG_1$ through $VG_4$ can have different switching frequencies in the open loop operation versus the closed loop operation, to enable control of ramp up time of the $V_{out}$ voltage.

Responsive to open loop control signal 1702, switching cycle determination circuit 1506 can provide switching cycle signal 1507 at the switching frequency and having the duty cycle specified by open loop control signal 1702, and control signal generator 1508 can generate control signals $VG_1$ through $VG_4$ responsive to a state of switching cycle signal 1507, to start a power transfer from power source 102 to secondary side circuit 404. Primary side soft start control circuit 1602 can also update the duty cycle specified in open loop control signal 1702 based on a pre-determined sequence. For example, primary side soft start control circuit 1602 can provide open loop control signal 1702 that specify a starting duty cycle at 12%, followed by subsequent open loop control signals 1702 that specify duty cycles of 25%, 50%, and 100%.

Primary side soft start control circuit 1602 can provide open loop control signal that specify a particular duty cycle across multiple switching cycles, and move to the next duty cycle if it does not receive data signal 1510. But if primary side soft start control circuit 1602 receives data signal 1510 from status signal receiver 414, which generates data signal 1510 by extracting symbols from status signal 442, primary side soft start control circuit 1602 can determine that secondary side circuit 404 is powered up and is capable of transmitting status signal 442. Accordingly, primary side soft start control circuit 1602 can stop the open loop operation. Switching cycle determination circuit 1506 can also start the closed loop operation and adjust the duty cycle/on-time period of the control signals based on feedback indicator 450 extracted from status signal 442.

Also, referring again to FIG. 16, secondary side soft start control circuit 1604 can be coupled to feedback voltage processor 422, status signal generator 426, and voltage divider network 432. Before the secondary side soft start operation starts, secondary side soft start control circuit 1604 can disable status signal generator 426, and monitor the ramping of feedback voltage 434 during the primary side soft start operation. Secondary side soft start control circuit 1604 can start the secondary side soft start operation if feedback voltage 434 exceeds a soft start threshold voltage, which can represent a undervoltage-lockout (UVLO) threshold for secondary side circuit 404. During the secondary side soft start operation, secondary side soft start control circuit 1604 can increase the target voltage for generation of feedback indicator 450 in steps until a final target voltage is reached, which allows controller 412 to also increase $V_{out}$ in steps responsive to feedback indicator 450 to the final target voltage.

In some examples, control signal generator 1508 can operate to reduce the occurrence of a lockup event, in which after being disabled, power stage 112 is enabled when power converter 400 still provides a large residual $V_{out}$ voltage. This may cause secondary side soft start control circuit 1604 to start the secondary side soft start operation if feedback voltage 434 (due to the large residual $V_{out}$ voltage) exceeds the UVLO threshold, when the rest of power converter 400 are not yet properly reset.

To reduce or prevent the lockup event, after control signal generator 1508 receives a fault message and provides control signals 214 through 218 ($VG_1$ through $VG_4$) to disable power stage 112, control signal generator 1508 can delay the start of the primary side soft start operation when signal extractor 1502 still receives status signal 442 from secondary side circuit 404. The reception of status signal 442 can indicate that secondary side circuit 404 is not yet powered down and there can still be a large residual $V_{out}$ voltage. Control signal generator 1508 can ignore enable signal 419 and maintain power stage 112 in the disabled state until communication channel 440 becomes inactive and signal extractor 1502 no longer receives status signal 442 from secondary side circuit 404. In some examples, control signal generator 1508 can also monitor for status signal 442 within a time window after receiving enable signal 419, and start the primary side soft start operation if communication channel 440 remains inactive within the window. For example, control signal generator 1508 can start timer 1528 responsive to receiving enable signal 419, and start the primary side soft start operation if no status signal 442 is received before timer 1528 expires. Control signal generator 1508 can also extend the time window (e.g., by resetting timer 1528) responsive to receiving status signal 442 within the time window. With such arrangements, power converter 400 can delay the primary side soft start operation until the $V_{out}$ voltage falls below the UVLO threshold, and power converter 400 can be properly reset, prior to starting the soft start sequence, which can reduce or prevent the occurrence of lockup event.

Figure 18:
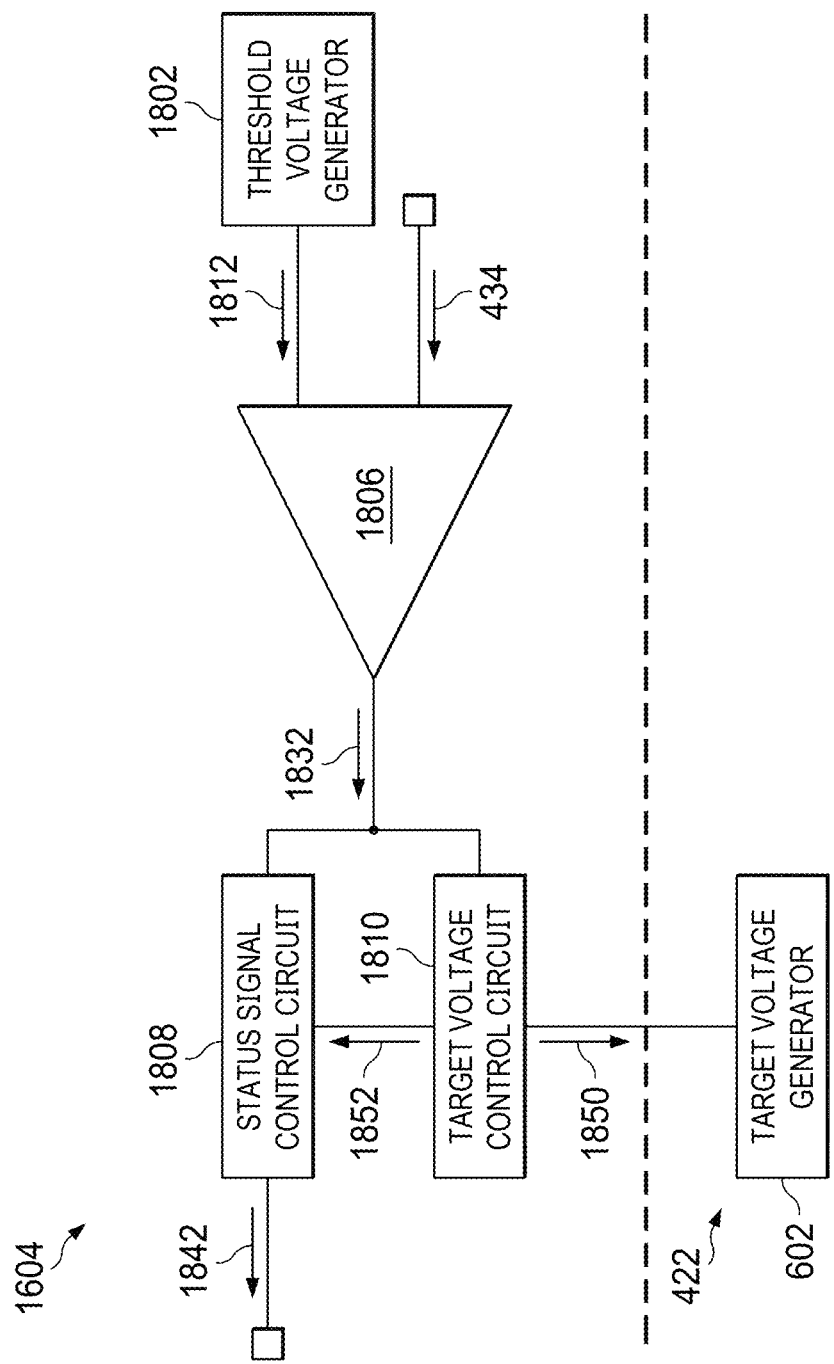

FIG. 18 is a schematic diagram of example internal components of secondary side soft start control circuit 1604. Referring to FIG. 18, secondary side soft start control circuit 1604 can include a threshold voltage generator 1802, a comparator 1806, a status signal control circuit 1808, and a target voltage control circuit 1810. Threshold voltage generator 1802 can generate a threshold voltage 1812 representing an UVLO threshold. Comparator 1806 can compare feedback voltage 434 with threshold voltage 1812 to generate a decision signal 1832, and provide decision signal 1832 to status signal control circuit 1808 and target voltage control circuit 1810. Responsive to decision signal 1832, status signal control circuit 1808 can generate a control signal 1842 to enable/disable status signal generator 426, and target voltage control circuit 1810 can generate a control signal 1850 to set a target voltage for feedback voltage processor 422.

Specifically, if feedback voltage 434 exceeds threshold voltage 1812, the supply voltages provided by secondary side coil 114b for feedback voltage processor 422, control message generator 424, and status signal generator 426 can be sufficiently high to allow these circuits to operate properly. Accordingly, if a state of decision signal 1832 indicates that feedback voltage 434 is below threshold voltage 1812, status signal control circuit 1808 can provide control signal 1842 to disable status signal generator 426, or otherwise to prevent status signal generator 426 from transmitting status signal 442 via communication channel 440. But if a state of decision signal 1832 indicates that feedback voltage 434 is above threshold voltage 1812, status signal control circuit 1808 can provide control signal 1842 to enable status signal generator 426, or to allow status signal generator 426 to transmit status signal 442.

Also, if a state of decision signal 1832 indicates that feedback voltage 434 is above threshold voltage 1812, target voltage control circuit 1810 can provide control signal 1850 to target voltage generator 602 to set the target voltage 606, which processing circuit 604 of feedback voltage processor 422 can compare with feedback voltage 434 to generate feedback indicator 450. As part of the secondary side soft start operation, target voltage control circuit 1810 can provide control signal 1850 to target voltage generator 602 to increase target voltage 606 based on a pre-determined sequence of target voltages. Processing circuit 604 can adjust feedback indicator 450 responsive to the increase in target voltage 606, which allows controller 412 to also adjust the on-time and off-time period durations based on the adjusted feedback indicator 450, and provide the control signals $VG_1$ through $VG_4$ within the respective on-time and off-time periods.

Further, after target voltage control circuit 1810 provides the last target voltage in the sequence, target voltage control circuit 1810 can provide a complete signal 1852 back to status signal control circuit 1808. Status signal control circuit 1808 can include complete signal 1852 in control signal 1842. Responsive to receiving complete signal 1852, status signal generator 426 can prioritize transmission of power good message in status signal 442 to controller 412, to avoid controller 412 receiving the power good message after timer 1518 expires and disabling power stage 112.

Figure 19:
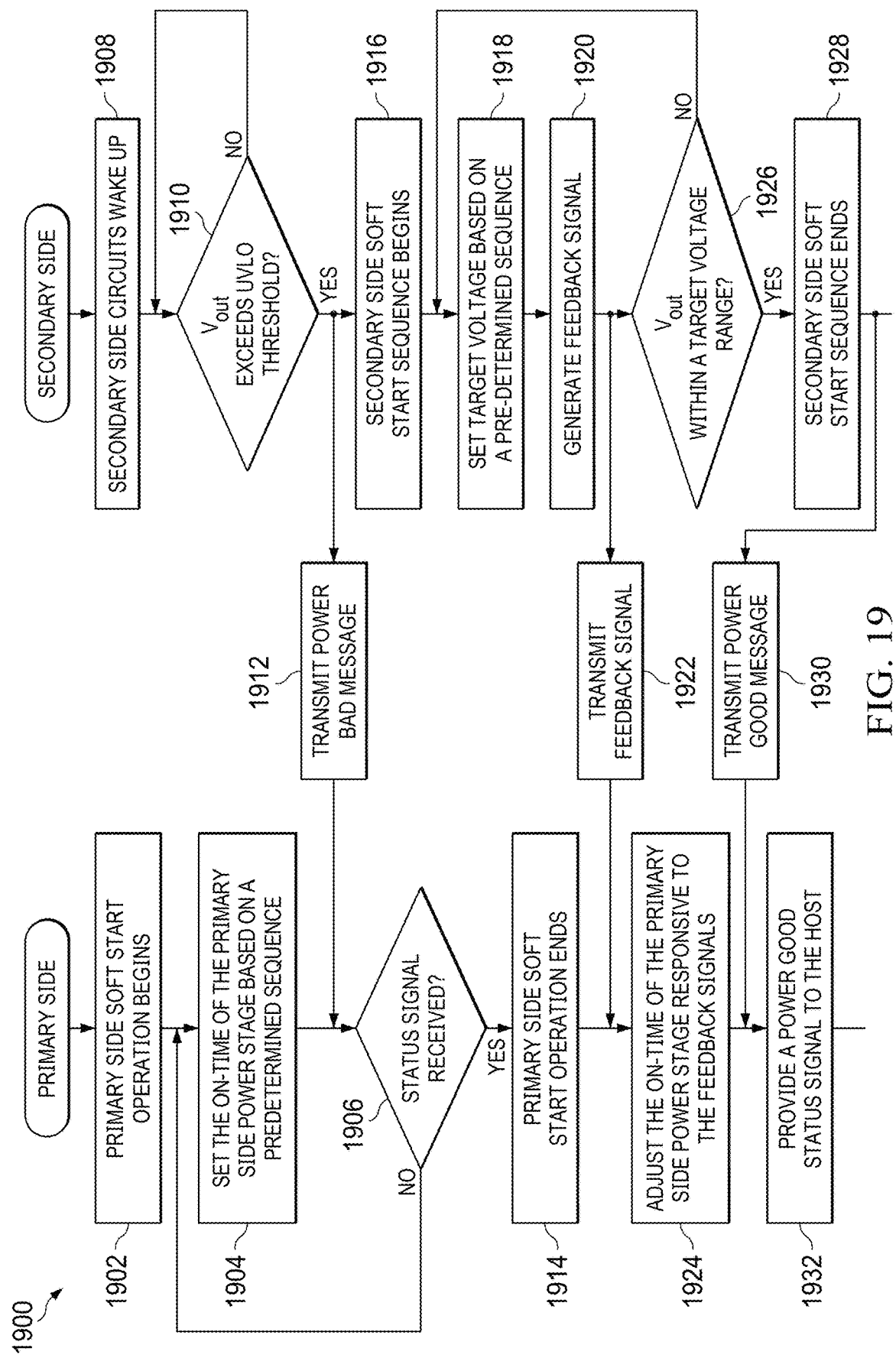
FIG. 19 is a flowchart of example soft-start operations by the power converter of FIGS. 16-18.
Figure 20:
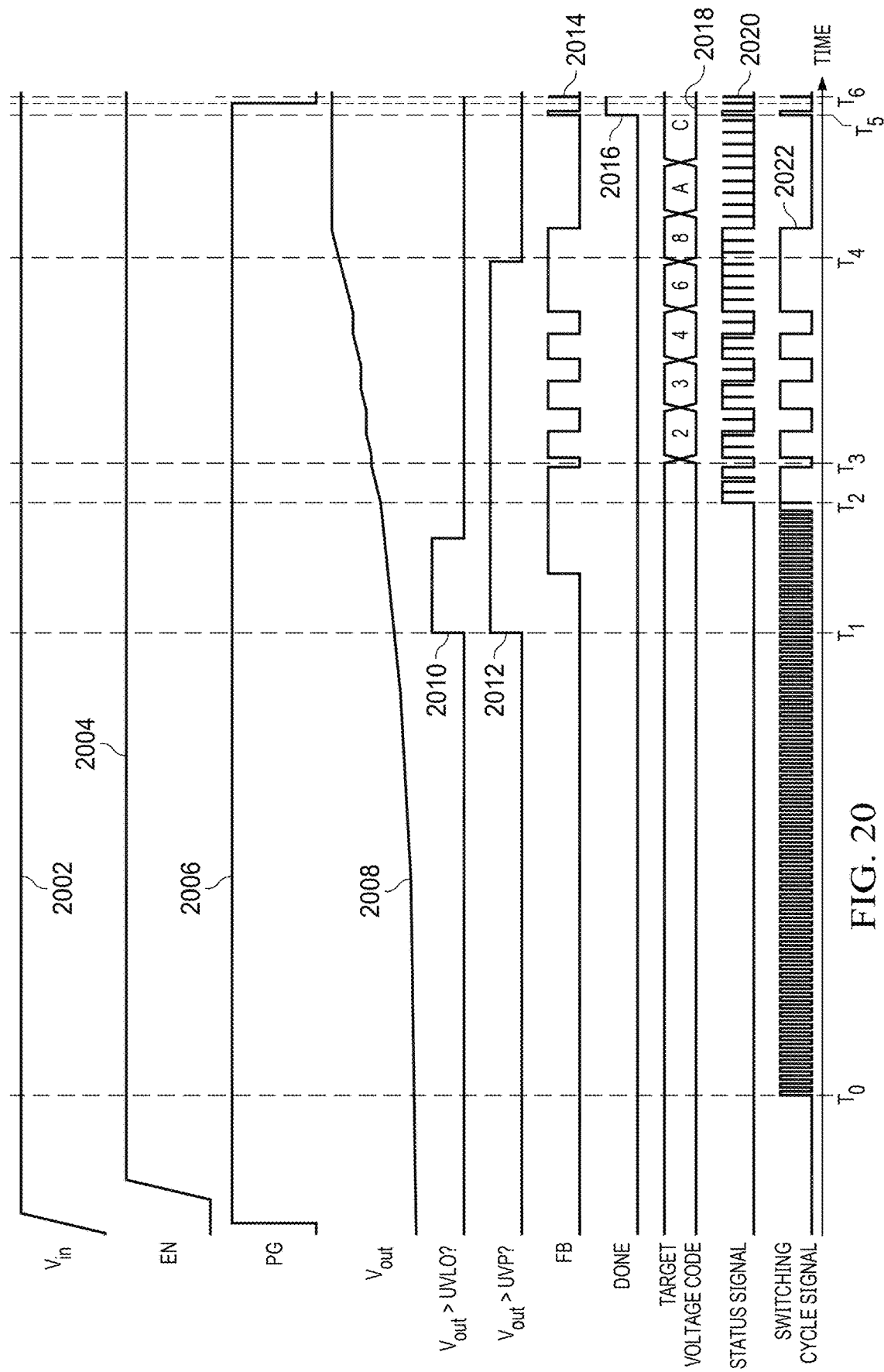
FIG. 20 are waveform diagrams that illustrate the example soft-start operations of FIG. 19.

FIG. 19 includes a flowchart 1900 of example primary side and secondary side soft start operations, and FIG. 20 includes waveform diagrams that illustrate the state of various signals of power converter 400 during the soft start operations described in FIG. 19. In FIG. 20, graph 2002 represents $V_{in}$, graph 2004 represents enable signal 419 (labelled "EN"), graph 2006 represents signal 419 (labelled "PG"), and graph 2008 represents $V_{out}$. Also, graph 2010 represents decision signal 1832 (labelled "$V_{out}$>UVLO?"), and graph 2012 represents decision signal 732 (labelled "$V_{out}$>UVP?") which indicates whether $V_{out}$ exceeds a lower limit of the target voltage range. Also, graph 2014 represents feedback indicator 450 (labelled "FB") that can include a hysteretic control signal, and graph 2016 represents an internal flag (labelled "Done") that indicates whether the secondary side soft start operation completes. Further, graph 2018 represents a target voltage code (labelled "target voltage code") included in control signal 1850 and graph 2020 represents status signal 442. Graph 2022 represents switching cycle signal 1507. The on-time periods can be represented by switching cycle signal 1507 being in the asserted state, and the off-time periods can be represented by switching cycle signal 1507 being in the de-asserted state.

Referring to FIG. 19, in step 1902, primary side soft start operation begins. Primary side soft start control circuit 1602 can start the soft start operation responsive to the assertion of the EN signal (enable signal 419) by, for example, a host that interfaces with power converter 400.

In some examples, as described above, control signal generator 1508 can start timer 1518 after providing de-asserted control signals $VG_1$ through $VG_4$ to disable power stage 112, and start the soft start operation after timer 1518 expires (and EN signal is also asserted), to provide sufficient time for power converter 400 to discharge and to properly reset before enabling power stage 112. Such arrangements can reduce the occurrence of a lockup event.

In step 1904, primary side soft start control circuit 1602 can set the duty cycle of switching cycle signal 1507 (and the on-time period durations of power stage 112) following a predetermined sequence. This is represented between times $T_0$ and $T_2$ in FIG. 20, when switching cycle determination circuit 1506 provides switching cycle signal 1507 at a high frequency in an open loop operation, and control signal generator 1508 can provide control signals $VG_1$ through $VG_4$ also at a high frequency responsive to switching cycle signal 1507. Also, between $T_0$ and $T_2$, controller 412 increases the duty cycle of switching cycle signal 1507 (and the on-time period duration of power stage 112) based on the sequence, and $V_{out}$ can increase accordingly.

Referring again to FIG. 19, primary side soft start control circuit 1602 can proceed to step 1906 and determine whether status signal 442 is received. Primary side soft start control circuit 1602 can proceed back to step 1904 and continue the open loop operation if status signal 442 is not received. Referring again to FIG. 20, if communication channel 440 remains in an inactive state and secondary side circuit 404 does not transmit status signal 442 between $T_0$ and $T_2$, primary side soft start control circuit 1602 can continue providing control signals $VG_1$ through $VG_4$ in the open loop operation.

In step 1908, secondary side circuit 404, including feedback voltage processor 450, control message generator 424, status signal generator 426, and secondary side soft start control circuit 1604 can wake up from a power down state. This can be due to these components receiving their supply voltages from secondary side coil 114b and their supply voltages increase with $V_{out}$.

In step 1910, secondary side soft start control circuit 1604 can determine whether $V_{out}$ exceeds an UVLO threshold based on, for example, comparing feedback voltage 434 with threshold voltage 1812. Secondary side soft start control circuit 1604 can disable status signal generator 426 and block the transmission of status signal 442 if $V_{out}$ is below UVLO threshold. This is also illustrated in graph 2010 of FIG. 20, where between $T_1$ and $T_2$ decision signal 1832 is in an asserted state indicating that $V_{out}$ is below UVLO threshold, and communication channel 440 remains in the inactive state.

Referring again to FIG. 19, in step 1910, if $V_{out}$ exceeds the UVLO threshold, secondary side soft start control circuit 1604 can proceed to step 1912 and allow status signal generator 426 to transmit a status signal 442. As described above, $V_{out}$ exceeding the UVLO threshold can indicate that the supply voltages for feedback voltage processor 422, control message generator 424, and status signal generator 426 are sufficiently high to allow these circuits to operate properly. Because $V_{out}$ is outside the target range, status signal generator 426 can transmit a status signal 442 including a power bad message to primary side circuit 402, in step 1912. Responsive to receiving status signal 442, and if timer 1516 has not expired (e.g., due to feedback indicator 450 changing states, or a heart beat message is received), primary side soft start control circuit 1602 can end the primary side soft start operation, in step 1914. These are also illustrated in FIG. 20, where between $T_2$ and $T_3$ primary side soft start control circuit 1602 receives the power bad message (represented by two pulses having $V_L$ state) and ends the primary side soft start operation. If timer 1516 has expired when status signal 442 is received, controller 412 may disable power stage 112.

Referring again to FIG. 19, in step 1916, secondary side soft start control circuit 1604 can start the secondary side soft start operation, responsive to $V_{out}$ exceeding the UVLO threshold. As part of the soft start operation, secondary side soft start control circuit 1604 (and target voltage control circuit 1810) can provide control signal 1850 to target voltage generator 602 to increase target voltage 606 based on a pre-determined sequence, in step 1918. Processing circuit 604 can generate feedback indicator 450 responsive to target voltage 606 and feedback voltage 434 in step 1920, and transmit feedback indicator as part of status signal 442 in step 1922. Controller 412 can then adjust switching cycle signal 1507 (and the on-time period duration of power stage 112) based on feedback indicator 450, in step 1924. Secondary side soft start control circuit 1604 can determine whether $V_{out}$ is within a target voltage range based on decision signals 732 and 734 in step 1926, and can repeat steps 1918 and 1920 if $V_{out}$ is outside the target range.

The operations described above can be illustrated in FIG. 20. Specifically, between $T_2$ and $T_3$, feedback voltage processor 422 provides feedback indicator 450 having the $V_H$ state, and status signal generator 426 can include feedback indicator 450 having the $V_H$ state before the pulses of control message 452. Controller 412 can perform a low pass filter operation on status signal 442 to extract symbols of feedback indicator 450, and determine that feedback indicator 450 in the $V_H$ state. Responsive to feedback indicator 450 being in the $V_H$ state, switching cycle determination circuit 1506 sets switching cycle signal 1507 to the asserted state. In response, control signal generator 1508 generates control signals $VG_1$ through $VG_4$ to enable power stage 112 to transfer power to load 104 between $T_2$ and $T_3$. $V_{out}$ can also increase between $T_2$ and $T_3$.

Also, between $T_3$ and $T_5$, secondary side soft start control circuit 1604 increases the target voltage code according to predetermined sequence (e.g., 0x2, 0x3, 0x4, 0x6, 0x8, 0xA, and 0xC), and feedback voltage processor 422 can adjust feedback indicator 450 to reflect the increase in the target voltage, which causes controller 412 to adjust the duty cycle of switching cycle signal 1507 (and on-time period of power stage 112). Accordingly, $V_{out}$ increases between $T_3$ and $T_5$. $V_{out}$ also increases above the lower limit of the target voltage range (UVP) at $T_4$, which causes decision signal 732 (represented by graph 2012) to trip. If $V_{out}$ is still below of an upper limit of the target range, or secondary side soft start controller 1604 has not completed sequencing through the target voltage codes, status signal generator 426 can transmit the power bad message in status signal 442. Controller 412 can also provide a power good signal 418 at a second state (e.g., a de-asserted state) to indicate that $V_{out}$ is still outside the target range.

Referring again to FIG. 19, in step 1926, if $V_{out}$ is within the target voltage range, control message generator 424 can proceed to step 1928 to end the secondary side soft start sequence, and then proceed to step 1930 to transmit a power good message in status signal 442. Controller 412 can provide a power good signal 418 at output voltage status terminal 416 responsive to receiving the power good message, and if neither timer 1516 or timer 1518 has expired, in step 1932. But if timer 1516 has expired (e.g., feedback indicator 450 remaining in a particular state over a threshold duration and not interrupted by a heartbeat message), or if timer 1518 has expired (e.g., power good message arriving too late after enable signal 419 is asserted), controller 412 can disable power stage 112.

The operations described above can be illustrated in FIG. 20. Specifically, at time $T_5$, $V_{out}$ is within the target voltage range, and secondary side soft start controller 1604 has completed sequencing through the target voltage codes. Accordingly, secondary side soft start control circuit 1604 can assert the internal flag (labelled "Done") at $T_5$ to indicate that the secondary side soft start operation has ended. Also, status signal generator 426 can transmit status signal 442 including the power good message. Responsive to the power good message, controller 412 can also set power good signal 418 to a first state (e.g., an asserted state) at time $T_6$ to indicate that $V_{out}$ is within the target voltage range, which allows the host to enable power gate 430 and allow load 104 to draw power from secondary side coil 114*b*.

Figure 21A:
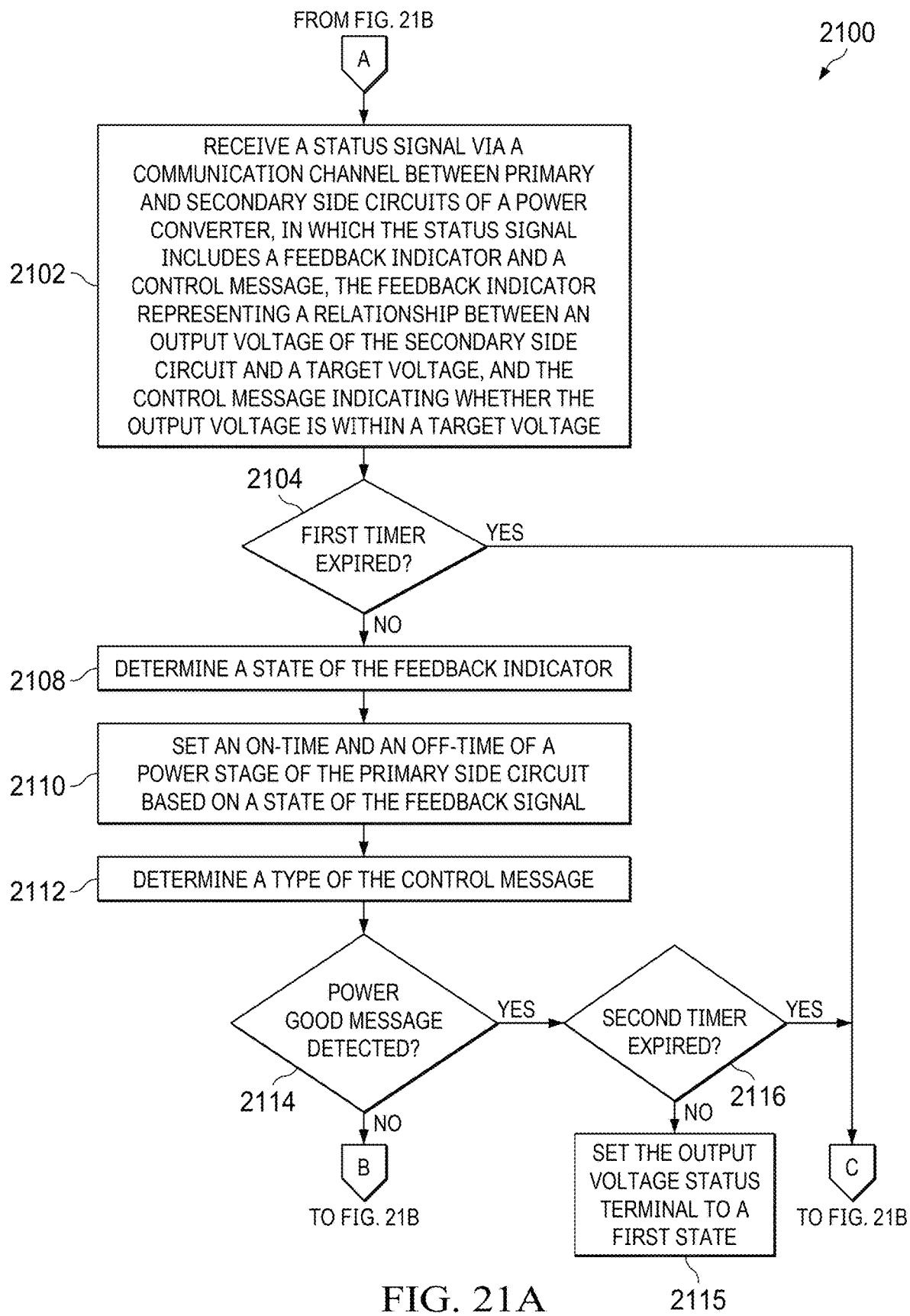
FIG. 21A and FIG. 21B are flowcharts of an example method of operating a power converter by a primary side circuit.
Figure 21B:
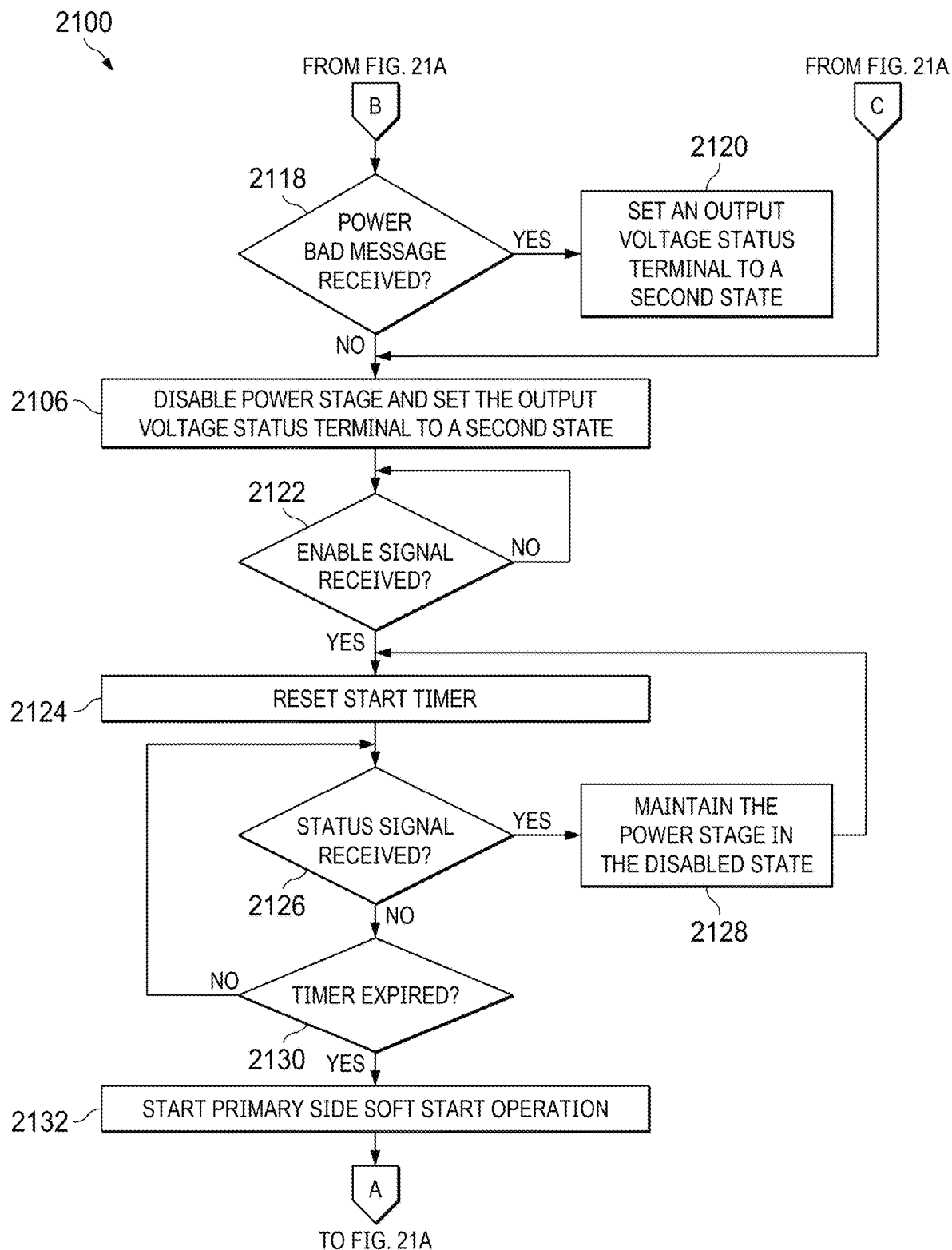

FIG. 21A and FIG. 21B are flowcharts of example method 2100 of operating a power converter, such as power converter 400 of FIG. 4. Method 2100 can be performed by, for example, various components of primary side circuit 402 including controller 412 and signal status receiver 414.

In step 2102, controller 412 may receive status signal 442 via communication channel 440 between primary side circuit 402 and secondary side circuit 404 of power converter 400. Status signal 442 may include feedback indicator 450 and control message 452. Feedback indicator 450 can represent a relationship between an output voltage ($V_{out}$) of the power converter secondary side circuit and target voltage 606, and control message 452 can indicate an operation status of the power converter including whether the output voltage is within a target voltage range.

Specifically, status signal 442 can include feedback indicator 450 within a first signal period and control message 452 within a second signal period, and both can be in the form of symbols. Depending on the property of communication channel 440, status signal 442 can be in the form of an electrical signal, a magnetic signal, or an optical signal. Also, status signal 442 can include a carrier signal modulated by the symbols of feedback indicator 450 and control message 452, as shown in FIG. 14.

In some examples, feedback indicator 450 may be in the form of a hysteretic control signal, and a state of feedback indicator 450 can indicate whether $V_{out}$ exceeds target voltage 606. In some examples, feedback indicator 450 can also include symbols representing a code, where the code indicates a difference between $V_{out}$ and target voltage 606.

Also, control message 452 can represent multiple types of control messages, each control message can represent a status of the output voltage and/or other operation conditions of power converter 400. For example, control message 452 can represent a power good signal which indicates that $V_{out}$ is within a target voltage range for safe/proper operation of load 104. Control message 452 can also represent a power bad signal which indicates that $V_{out}$ is outside the target voltage range. Also, control message 452 can represent a fault signal which indicates that $V_{out}$ is outside the target voltage range, or a temperature of secondary side circuit 404

(or power converter 400 as a whole) exceeds a threshold temperature, for a threshold duration of time. Control message 452 can include pulses in the symbols, where different types of control message 452 can be represented by different number of pulses, and the pulses can have the same pulse width between the symbols. For example, as illustrated in FIGS. 10-12, the symbols of a power good message can have one pulse followed by an end symbol, the symbols of a power bad message can have two pulses, and the symbols of a fault message can have three pulses.

In step 2104, controller 412 can determine whether a first timer (e.g., timer 1516) has expired when the status signal is received. Controller 412 may monitor for activity in communication channel 440 to determine whether secondary side circuit 404 is operational. Timer 1516 can expire after a threshold duration of time, which can represent a heartbeat interval. Controller 412 can start/reset timer 1516 responsive to detecting a state change in status signal 442, which an be due to state change in feedback indicator 450, or presence of control message 452. If timer 1516 has expired, which can indicate potential issue at secondary side circuit 404, controller 412 can proceed to step 2106, where controller 412 can disable power stage 112 (e.g., by de-asserting control signals $VG_1$ through $VG_4$) and set output voltage status terminal 416 is set to a second state (e.g., a de-asserted state).

If the timer 1516 has not expired, controller 412 can reset timer 1516, and then proceed to step 2108 to determine a state of feedback indicator 450. Specifically, signal extractor 1502 can detect symbols of feedback indicator 450 from status signal 442 by, for example, detecting presence or absence of a carrier signal in status signal 442, or detecting the amplitude of status signal 442, and synchronizing the detected symbols with clock signal 1512. Controller 412 can also apply a low pass filtering operation to separate the symbols of feedback indicator 450 from the symbols of control message 452, based on the symbols of feedback indicator 450 having a lower bandwidth than the symbols of control message 452.

In step 2110, controller 412 can set an on-time period and an off-time period of power stage 112 of primary side circuit 402 based on a state of feedback indicator 450. Specifically, referring again to FIG. 20, in a case where feedback indicator 450 includes a hysteretic control signal, the state of feedback indicator 450 can be one of two states (e.g., $V_H$ and $V_L$ states of FIGS. 10-12). Controller 412 can set the on-time/off time of power stage 112 (e.g., by providing switching cycle signal 1507 in the first state) responsive to feedback indicator 450 having a first state indicating that $V_{out}$ is below the target voltage, and the on-time period of power stage 112 can be equal to the duration in which feedback indicator 450 is in the first state. Also, controller 412 can also disable/turn off power stage 112 (e.g., by providing switching cycle signal 1507 in the second state) responsive to feedback indicator 450 having a second state indicating that $V_{out}$ is above the target voltage, and the off-time period of power stage 112 can be equal to the duration in which feedback indicator 450 is in the second state. In some examples, feedback indicator 450 can represent a code representing the error/difference between $V_{out}$ and the target voltage, and controller 412 can set the durations of the on-time and off-time periods of power stage 112 based on the code.

In step 2112, controller 412 can determine a type of control message included in control message 452. As described above, controller 412 can also apply a low pass filtering operation to separate the symbols of feedback indicator 450 from the symbols of control message 452. Controller 412 can determine a type of control message based on a number of pulses included in the symbols. For example, the symbols of a power good message can have one pulse, the symbols of a power bad message can have two pulses, and the symbols of a fault message can have three pulses. The symbols of each symbol can also include an end symbol following the pulses.

In step 2114, controller 412 can determine whether control message 452 includes a power good message based on whether control message 452 includes a single pulse followed by an end symbol. In some examples, if control message 452 includes a power good message, controller 412 can proceed to step 2115 and set output voltage status terminal 416 to a first state (e.g., by providing power good signal 418 having the first state) to indicate that $V_{out}$ is within the target voltage range for safe/proper operation of load 104. Responsive to output voltage status terminal 416 being in the first state, a host can enable power gate 430 to allow load 104 to draw power from power converter 400.

In some examples, controller 412 can also determine whether the power good message is received after a second timer (e.g., timer 1518) has expired, in step 2116. Controller 412 can start/reset timer 1518 after receiving enable signal 419, and determine whether the power good message is received before timer 1518 expires. If the power good message is not received before timer 1518 expires, controller 412 can also proceed to step 2116 and set output voltage status terminal 416 to the second state and disable power stage 112.

In step 2118 controller 412 determines whether a power bad message is received. Reception of the power bad message can indicate that secondary side circuit 404 is active and $V_{out}$ is outside the target voltage range. If the power bad message is received, controller 412 can proceed to step 2120 and set output voltage status terminal 416 to the second state, which can indicate that the secondary voltage $V_{out}$ is not in the target voltage range. Responsive to output voltage status terminal 416 being in the second state, the host can disable power gate 430 to prevent load 104 from drawing power from power converter 400.

If controller 412 determines that power bad message is not received, controller 412 may determine that control message 452 includes a fault message, based on whether control message 452 includes three pulses followed by an end symbol. If a fault message is received, controller 412 can also proceed to step 2106 and disable power stage 112 to stop the power transfer to secondary side circuit 404.

FIG. 21B illustrates additional steps of method 2100 after controller 412 disables power stage 112 in step 2106, to delay the primary side soft start sequence until the $V_{out}$ voltage has dropped below the UVLO threshold and to reduce the occurrence of a lockup event. Referring to FIG. 21B, in step 2122, controller 412 can determine whether enable signal 419 is received. Enable signal 419 can be received at terminal 417 and can be provided by the host to enable power converter 400. Controller 412 can continue monitoring for enable signal 419 responsive to not receiving the signal.

If controller 412 receives enable signal 419 in step 2122, controller 412 can proceed to step 2124 and reset a timer (e.g., timer 1528), to start a time window in which controller 412 monitors for status signal 442. The reception of status signal 442 can indicate that secondary side circuit 404 is still operating, and a large residual $V_{out}$ voltage may remain. Accordingly, if controller 412 determines that status signal 442 is received in step 2126, it can proceed to step 2128 and maintain power stage 112 in the disabled state. Controller 412 can also proceed back to step 2124 to restart the timer and extend the time window. Also, if no status signal 442 is received, but the timer has not yet expired (in step 2130), controller 412 can proceed back to step 2126 to continue monitoring for status signal 442.

On the other hand, if the timer expires (in step 2130), which can indicate that no status signal 442 is received within the time window, controller 412 can start primary side soft start operation, in step 2132. Details of the primary side soft start operation is described in FIG. 19 and FIG. 20. After the primary side soft start operation completes, controller 412 can proceed to step 2102 to receive status 442 signal from secondary side circuit 404 via communication channel 440.

Figure 22:
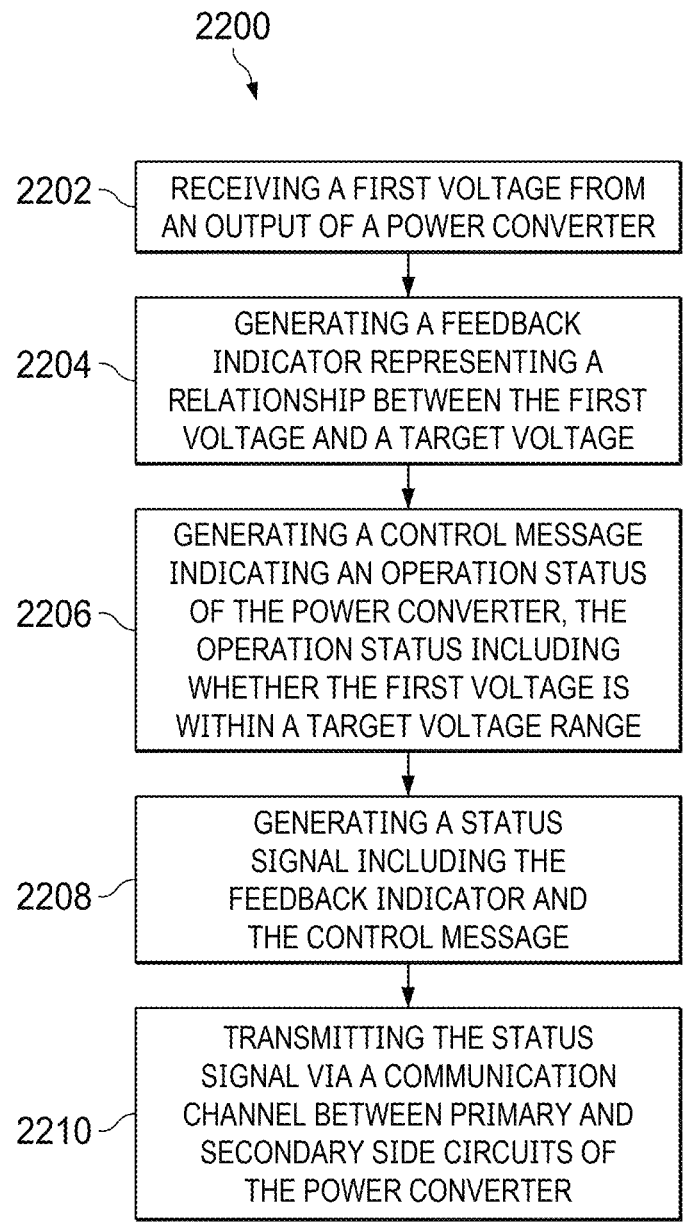
FIG. 22 is a flowchart of an example method of operating a power converter by a secondary side circuit.

FIG. 22 is a flowchart of an example method 2200 of operating a power converter, such as power converter 400 of FIG. 4. Method 2200 can be performed by, for example, various components of secondary side circuit 404 including feedback voltage processor 422, control message generator 424, and status signal generator 426. Method 2200 can be performed during or after the example secondary side soft start operation of FIG. 19.

In step 2202, feedback voltage processor 422 and control message generator 424 can receive a first voltage from an output of power converter 400. First voltage can represent $V_{out}$. In some examples, first voltage can be feedback voltage 434 from voltage divider network 432, and first voltage can be a scaled version of $V_{out}$.

In step 2204, feedback voltage processor 422 can generate feedback indicator 450 representing a relationship between the first voltage and target voltage 606. In some examples, feedback indicator 450 can include a hysteretic control signal, where feedback indicator 450 can have one of two states depending on whether the first voltage exceeds the target voltage. In some examples, feedback indicator 450 can include a code representing an error/difference between the first voltage and the target voltage.

In step 2206, control message generator 424 can generate control message 452 indicating an operation status of power converter 400, the operation status including whether the first voltage is within a target voltage range. As described above, control message generator 424 can generate a power good message if the first voltage is within a target voltage range, a power bad message if the first voltage is outside the target voltage range, and a fault message if, for a threshold duration of time, the first voltage is outside the target voltage range or a temperature of secondary side circuit 404 (or power converter 400) exceeds a threshold temperature. Control message generator 424 can generate symbols including different number of pulses followed by an end symbol for different types of control messages.

In step 2208, status signal generator 426 can generate status signal 442 including feedback indicator 450 in a first signal period and control message 452 in a second signal period. Status signal generator 426 can receive symbols of feedback indicator 450 and control message 452, synchronize them with clock signal 808, and insert the symbols into status signal 442 within the first signal period and the second signal period defined based on clock signal 808. In some examples, status signal generator 426 can also set the voltage state of the pulses of the symbols of control message 452 to be opposite to the voltage state of the symbols of feedback indicator 450, as shown in FIGS. 10-12.

As described above in FIG. 9, status signal generator 426 can determine the first symbol period (to insert the symbols of feedback indicator 450) and the second symbol period (to insert the symbols of control message 452) based on various techniques. For example, status signal generator 426 can determine the first and second symbol periods following a predetermined schedule. In some examples, status signal generator 426 can also interrupt the transmission of feedback indicator 450 and insert the symbols of control message 452 if control message 452 has a higher priority. For example, if control message 452 includes the first power good message after the completion of the secondary side soft start operation, status signal generator 426 may interrupt the transmission of feedback indicator 420, and transmit control message 452 including the power good message, to avoid controller 412 disabling power stage 112 due to expiration of timer 1518. In some examples, if status signal generator 426 determines that feedback indicator 420 remains in a particular state over a threshold duration of time, status signal generator 426 may interrupt the transmission of feedback indicator 420 and transmit control message 452 including the power bad message as a heartbeat signal, to avoid controller 412 disabling power stage 112 due to perceived inactivity of secondary side circuit 404.

In step 2210, status signal generator 426 can transmit status signal 442 via communication channel 440 between primary side circuit 402 and secondary side circuit 404. Depending on the property of communication channel 440, status signal generator 426 can transmit status signal 442 as an electrical signal, a magnetic signal, or an optical signal. Status signal generator 426 can also transmit status signal 442 by modulating a carrier signal based on the symbols of feedback indicator 450 and control message 452.

FIG. 23 is a schematic diagram of an example power converter 2300 with different semiconductor dies. In some examples, power converter 2300 includes a chip package 2350 that includes a primary side circuit 402 on a first semiconductor die 2302, a transformer 114 on a second semiconductor die 2314, a secondary side circuit 404 on a third semiconductor die 2304, and a communication channel device 440 on a fourth semiconductor die 2340.

Any of the methods described herein may be totally or partially performed with a computing system including one or more processors, which can be configured to perform the steps. Thus, embodiments can be directed to computing systems configured to perform the steps of any of the methods described herein, potentially with different components performing respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

In this description, the term "couple" may cover connections, communications or signal paths that enable a functional relationship consistent with this description. For example, if device A provides a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described herein as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

Certain components may be described herein as being of a particular process technology, but these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor.

Uses of the phrase "ground voltage potential" in this description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described examples, and other examples are possible, within the scope of the claims.

What is claimed is:

1. An apparatus comprising:
   a power stage having a power stage control input; and
   a controller having an enable input, a timer, a control input, a control output, and an output voltage status terminal, the control output coupled to the power stage control input, and the controller configured to:
   receive a status signal at the control input, in which the status signal includes a set of symbols representing a feedback indicator and a control message, the feedback indicator represents a relationship between an output voltage and a target voltage, and the control message indicates whether the output voltage is within a target voltage range;
   responsive to the feedback indicator, provide a control signal at the control output;
   responsive to the control message, set a state of the output voltage status terminal indicating whether the output voltage is within the target voltage range;
   start the timer responsive to a state change of the enable input indicating the power stage is enabled; and
   responsive to not receiving the control message indicating the output voltage is within the target voltage range before the timer expires, set the control signal to disable the power stage.

2. The apparatus of claim 1, further comprising a transformer having a primary side and a secondary side, in which the power stage has a power stage output coupled to the primary side, and the secondary side is configured to provide the output voltage.

3. The apparatus of claim 1, wherein the controller is configured to set a state of the control signal responsive to a state of the feedback indicator.

4. The apparatus of claim 1, wherein the controller is configured to, before receiving the status signal, set a duty cycle of the control signal following a particular sequence of duty cycles.

5. The apparatus of claim 1, wherein the controller is configured to set the control signal to a first state responsive to the feedback indicator being in a particular state for a threshold duration of time, and the power stage is disabled responsive to the control signal having the first state.

6. The apparatus of claim 1, wherein the control message includes one of:
   a first message indicating that the output voltage is within the target voltage range;
   a second message indicating that the output voltage is out of the target voltage range; or
   a third message indicating at least one of: that the output voltage is outside the target voltage range for a threshold duration of time, or that a temperature exceeds a threshold temperature for the threshold duration of time.

7. The apparatus of claim 6, wherein the controller is configured to:
   set the output voltage status terminal to a first state responsive to the control message including the first message; and
   set the output voltage status terminal to a second state responsive to the control message not including the first message.

8. The apparatus of claim 6, wherein the controller is configured to set the control signal to a first state responsive to the control message including the third message, and the power stage is disabled responsive to the control signal having the first state.

9. The apparatus of claim 8, wherein the controller is configured to:
   set the control signal to the first state responsive to not receiving the control message including the first message before the timer expires.

10. The apparatus of claim 8, wherein the controller has an enable input and includes a timer, and the controller is configured to:
    set the control signal to the first state;
    start the timer responsive to a state change of the enable input;
    reset the timer responsive to receiving the status signal; and
    after the timer expires, set the control signal to a second state; and
    wherein the power stage is enabled responsive to the control signal having the second state.

11. The apparatus of claim 6, wherein:
    the set of symbols includes a first set of symbols and a second set of symbols;
    the control message includes first, second, and third numbers of pulses representing respective first, second, and third messages, and a pulse of the first, second, and third numbers of pulses has a different state from the feedback indicator preceding the control message in the first set of symbols; and the second set of symbols includes the first, second, and third numbers of pulses.

12. The apparatus of claim 11, wherein the controller is configured to:
determine a state of the feedback indicator by performing a low pass filtering operation on the status signal; and
identify one of the first, second, or third messages based on a number of state transitions in the status signal.

13. The apparatus of claim 1, wherein the status signal includes an electrical signal, a magnetic signal, or a light signal.

14. An apparatus comprising:
a feedback voltage processor having first and second inputs and a feedback output, the first input coupled to a power converter output terminal, the second input coupled to a target voltage terminal, and the feedback voltage processor configured to generate a feedback indicator at the feedback output responsive to a first voltage at the power converter output terminal and a target voltage at the target voltage terminal;
a control message generator having a control input and a control message output, the control input coupled to the power converter output terminal, and the control message generator configured to provide a control message at the control message output responsive to whether the first voltage is within a target voltage range; and
a status signal generator having a first signal input, a second signal input, and a status signal output, the first signal input coupled to the feedback output, the second signal input coupled to the control message output, and the status signal generator configured to:
receive the feedback indicator at the first signal input;
receive the control message at the second signal input; and
provide a status signal at the status signal output, the status signal including a set of symbols that includes the feedback indicator and the control message,
wherein:
the set of symbols includes a first set of symbols and a second set of symbols;
the control message includes first, second, and third numbers of pulses representing respective first, second, and third messages, and a pulse of the first, second, and third numbers of pulses has a different state from the feedback indicator preceding the control message in the first set of symbols; and
the second set of symbols includes the first, second, and third numbers of pulses.

15. The apparatus of claim 14, wherein the status signal generator is configured to provide the feedback indicator as the status signal in a first signal period and the control message as the status signal in a second signal period.

16. The apparatus of claim 14, further comprising a transformer having a primary side and a secondary side, in which the power converter output terminal is coupled to the secondary side, and the status signal is targeted at a controller coupled to the primary side.

17. The apparatus of claim 14, wherein the feedback voltage processor is configured to:
set the feedback indicator to a first state responsive to the first voltage exceeding the target voltage; and
set the feedback indicator to a second state responsive to the first voltage not exceeding the target voltage.

18. The apparatus of claim 14, wherein the control message includes one of:
a first message indicating that the first voltage is within the target voltage range;
a second message indicating that the first voltage is outside the target voltage range; or
a third message indicating at least one of: that the first voltage is outside the target voltage range for a threshold duration of time, or that a temperature exceeds a threshold temperature for the threshold duration of time.

19. The apparatus of claim 18, wherein the status signal generator is configured to:
provide the feedback indicator as the status signal;
receive the control message; and
responsive to the feedback indicator being in a particular state for a threshold duration of time:
stop providing the feedback indicator as the status signal; and
provide the control message as the status signal.

20. The apparatus of claim 18, further comprising a soft start control circuit having a status signal control output, the soft start control circuit configured to provide a control signal at the status signal control output indicating whether a soft start operation completes,
wherein the status signal generator has a status signal control input coupled to the status signal control output and is configured to:
provide the feedback indicator as the status signal;
receive the control message including the first message;
receive the control signal at the status signal control input; and
responsive to receiving the first message, and the control signal indicating that the soft start operation completes:
stop providing the feedback indicator as the status signal; and
provide the control message including the first message as the status signal.

21. The apparatus of claim 20, wherein the control signal is a first control signal, and the apparatus further comprises a voltage source having a target voltage control input and a target voltage output, the target voltage output coupled to the target voltage terminal, and the voltage source configured to set the target voltage responsive to a second control signal at the target voltage control input, and provide the target voltage at the target voltage output; and
wherein the soft start control circuit has a target voltage control output coupled to the target voltage control input and configured to:
provide a sequence of the second control signal indicating different target voltages; and
after providing the sequence, provide the first control signal at the status signal control output, in which the first control signal indicates that the soft start operation has completed.

22. The apparatus of claim 21, wherein the soft start control circuit is configured to, responsive to the first voltage being below an undervoltage lockout (UVLO) threshold, provide a third control signal at the status signal control output indicating that the status signal generator is to be disabled, and the status signal generator is disabled responsive to receiving the third control signal.

23. A method comprising:
receiving an enable input indicating a power converter is enabled to output power;
responsive to the enable input, starting a timer;

receiving a status signal via a communication channel between primary side and secondary side circuits of the power converter, in which the status signal includes a set of symbols based on a feedback indicator and a control message, in which the feedback indicator represents a relationship between a target voltage and an output voltage of the secondary side circuit, and the control message indicates whether the output voltage is within a target voltage range;

determining a state of the feedback indicator;

responsive to the state of the feedback indicator, set an on-time period and an off-time period of a power stage of the primary side circuit;

responsive to the control message, set a state of an output voltage status terminal indicating whether the output voltage is within the target voltage range; and responsive to not receiving the control message indicating the output voltage is within the target voltage range before the timer expires, set a control signal to disable the power converter.

24. The method of claim 23, wherein the control message includes one of:
a first message indicating that the output voltage is within the target voltage range;
a second message indicating that the output voltage is outside the target voltage range; or
a third message indicating at least one of: that the output voltage is outside the target voltage range for a threshold duration of time, or that a temperature of the secondary side circuit exceeds a threshold temperature for the threshold duration of time.

25. The method of claim 24, further comprising:
responsive to receiving the control message including the first message, setting the output voltage status terminal to a first state;
responsive to receiving the control message including the second message, setting the output voltage status terminal to a second state; and
responsive to receiving the control message including the third message, disabling the power stage.

26. The method of claim 23, further comprising, before receiving the status signal, setting the on-time period and the off-time period of the power stage following a particular sequence of duty cycles.

27. A method comprising:
receiving a first voltage from an output of a power converter;
generating a feedback indicator representing a relationship between the first voltage and a target voltage;
generating a control message indicating whether the first voltage is within a target voltage range;
generating a status signal that includes a set of symbols based on the feedback indicator and the control message; and
transmitting the status signal via a communication channel between primary and secondary side circuits of the power converter;
wherein:
the set of symbols includes a first set of symbols and a second set of symbols;
the control message includes first, second, and third numbers of pulses representing respective first, second, and third messages, and a pulse of the first, second, and third numbers of pulses has a different state from the feedback indicator preceding the control message in the first set of symbols; and
the second set of symbols includes the first, second, and third numbers of pulses.

28. The method of claim 27, wherein the control message includes one of:
a first message indicating that the first voltage is within the target voltage range;
a second message indicating that the first voltage is outside the target voltage range; or
a third message indicating at least one of: that the first voltage is outside the target voltage range for a threshold duration of time, or that a temperature of the secondary side circuit exceeds a threshold temperature for the threshold duration of time.

29. The method of claim 27, further comprising:
determining whether the first voltage exceeds a UVLO threshold; and
responsive to the first voltage exceeding the UVLO threshold, increasing the target voltage based on a particular sequence of target voltages.

30. An apparatus, comprising:
a primary side circuit including:
a power stage having a power stage voltage input, a power stage control input, and a power stage output; and
a controller having an enable input, a timer, a power stage control output, an output voltage status terminal, an enable input terminal, and a status signal input, the power stage control output coupled to the power stage control input, wherein the controller is configured to:
start the timer responsive to a state change of the enable input indicating the power stage is enabled; and
responsive to not receiving a control message indicating an output voltage at an output voltage terminal is within a target voltage range before the timer expires, set a control signal to disable the power stage;
a transformer having a primary side coil and a secondary side coil, the primary side coil coupled to the power stage output;
a secondary side circuit having a secondary side input and an the output voltage terminal, the secondary side input coupled to the secondary side coil, the secondary side circuit including:
a feedback voltage processor having a feedback input and a feedback output, the feedback input coupled to the output voltage terminal;
a control message generator having a control input and a control message output, the control input coupled to the output voltage terminal; and
a status signal generator having first and second signal inputs and a status signal output, the first signal input coupled to the feedback output, and the second signal input coupled to the control message output; and
a communication channel device having a channel input and a channel output, the channel input coupled to the status signal output, and the channel output coupled to the status signal input.

31. The apparatus of claim 30, wherein:
the controller is configured to:
receive a status signal at the status signal input, the status signal including a feedback indicator and a control message;

generate a control signal at the power stage control output responsive to a state of the feedback indicator; and set a state of the output voltage status terminal responsive to the control message;

the feedback voltage processor is configured to generate, at the feedback output, the feedback indicator representing a relationship between a first voltage at the output voltage terminal and a target voltage;

the control message generator is configured to generate the control message indicating whether the first voltage is within a target voltage range; and the status signal generator is configured to generate the status signal responsive to the feedback indicator at the first signal input and the control message at the second signal input; and the communication channel device is configured to transmit the status signal from the channel input to the channel output.

32. The apparatus of claim 30, wherein:
the primary side circuit is on a first semiconductor die;
the transformer is on a second semiconductor die;
the secondary side circuit is on a third semiconductor die;
the communication channel device is on a fourth semiconductor die; and
first through fourth semiconductor dies are enclosed in a chip package.

* * * * *